(12) United States Patent
Valente et al.

(10) Patent No.: US 12,437,445 B2
(45) Date of Patent: Oct. 7, 2025

(54) IMAGE COMBINATIONS FOR HIGH DYNAMIC RANGE PROCESSING

(71) Applicant: GoPro, Inc., San Mateo, CA (US)

(72) Inventors: Stephane Valente, Paris (FR); Miguel Marques, Bois d'Arcy (FR); Romain Gounelle, Paris (FR)

(73) Assignee: GoPro, Inc., San Mateo, CA (US)

( * ) Notice: Subject to any disclaimer, the term of this patent is extended or adjusted under 35 U.S.C. 154(b) by 198 days.

(21) Appl. No.: 18/201,386

(22) Filed: May 24, 2023

(65) Prior Publication Data

US 2024/0394923 A1    Nov. 28, 2024

(51) Int. Cl.
*H04N 23/73*  (2023.01)
*G06T 7/00*   (2017.01)
*G06T 7/20*   (2017.01)

(52) U.S. Cl.
CPC ............ *G06T 7/97* (2017.01); *G06T 7/20* (2013.01); *H04N 23/73* (2023.01); *G06T 2207/20208* (2013.01); *G06T 2207/20212* (2013.01)

(58) Field of Classification Search
None
See application file for complete search history.

(56) References Cited

U.S. PATENT DOCUMENTS

| | | | | |
|---|---|---|---|---|
| 8,866,927 B2 * | 10/2014 | Levoy | ........... | H04N 23/741 348/222.1 |
| 10,587,816 B1 * | 3/2020 | Douady | ........... | H04N 23/73 |
| 2014/0152694 A1 * | 6/2014 | Narasimha | ........... | G06T 5/50 345/629 |
| 2014/0307129 A1 * | 10/2014 | Feng | ........... | H04N 23/88 348/242 |
| 2014/0333801 A1 * | 11/2014 | Moon | ........... | H04N 23/6845 348/231.99 |
| 2015/0002733 A1 * | 1/2015 | Geiss | ........... | H04N 23/71 348/365 |
| 2016/0093029 A1 * | 3/2016 | Micovic | ........... | G06T 3/14 348/229.1 |
| 2016/0381302 A1 * | 12/2016 | Shikata | ........... | H04N 23/80 348/239 |
| 2018/0376087 A1 * | 12/2018 | Kadambala | ........... | H04N 23/80 |
| 2019/0260978 A1 * | 8/2019 | Guérin | ........... | H04N 23/62 |
| 2020/0204721 A1 * | 6/2020 | Douady | ........... | H04N 23/60 |
| 2022/0345605 A1 * | 10/2022 | Chuang | ........... | H04N 23/741 |
| 2023/0199337 A1 * | 6/2023 | Wang | ........... | G06T 3/4015 348/240.2 |
| 2023/0353881 A1 * | 11/2023 | Ravirala | ........... | H04N 23/683 |

* cited by examiner

*Primary Examiner* — James M Hannett
(74) *Attorney, Agent, or Firm* — Young Basile Hanlon & MacFarlane, P.C.

(57) ABSTRACT

Multiple images that include a first image, a second image, and a third image are received. The multiple images are such that the second image is temporally between the first image and the third image. The first image, the second image, and the third image are combined to obtain a long-exposure image. High dynamic range processing is applied to the second image and the long-exposure image to obtain an output image with a larger dynamic range than a dynamic range of the second image. The high dynamic range processing uses the second image as a short-exposure image. An image based on the output image is transmitted, stored, or displayed.

20 Claims, 11 Drawing Sheets

IMAGE COMBINATIONS FOR HIGH DYNAMIC RANGE PROCESSING

TECHNICAL FIELD

This disclosure relates to combining images for High Dynamic Range (HDR) processing.

BACKGROUND

Image capture devices, such as cameras, may capture content as images (e.g., still images or frames of video). Light may be received and focused via a lens and may be converted to an electronic image signal by an image sensor. The image signal may be processed by an image signal processor (ISP) to form an image, which may be stored and/or encoded. In some implementations, a short-exposure image and a corresponding long-exposure image of a scene are combined using HDR processing to determine an output image with a larger dynamic range than that of the short-exposure image and the long-exposure image individually.

SUMMARY

Disclosed herein are implementations of combining images for HDR processing.

A first aspect of the disclosed implementations is a method that includes receiving multiple images that include a first image, a second image, and a third image such that the second image is temporally between the first image and the third image; combining the first image, the second image, and the third image to obtain a long-exposure image; applying high dynamic range processing that uses the second image as a short-exposure image to the second image and the long-exposure image to obtain an output image with a larger dynamic range than a dynamic range of the second image; and transmitting, storing, or displaying an image based on the output image.

A second aspect of the disclosed implementations is an apparatus that includes a processor. The processor is configured to receive a first image, a second image, and a third image, which are such that the second image is temporally between the first image and the third image; combine the first image, the second image, and the third image to obtain a long-exposure image; apply high dynamic range processing that uses the second image as a short-exposure image to the second image and the long-exposure image to obtain an output image with a larger dynamic range than a dynamic range of the second image; and transmit, store, or display an image based on the output image.

A third aspect of the disclosed implementations is non-transitory computer-readable storage medium that includes instructions executable by a processor to receive a first image, a second image, a third image, and a fourth image; combine the first image and the third image to obtain a long-exposure image; combine the second image, the third image, and the fourth image to obtain a short-exposure image; apply high dynamic range processing to the short-exposure image and the long-exposure image to obtain an output image with a larger dynamic range than any of the first image, the second image, the third image, and the fourth image; and transmit, store, or display an image based on the output image.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
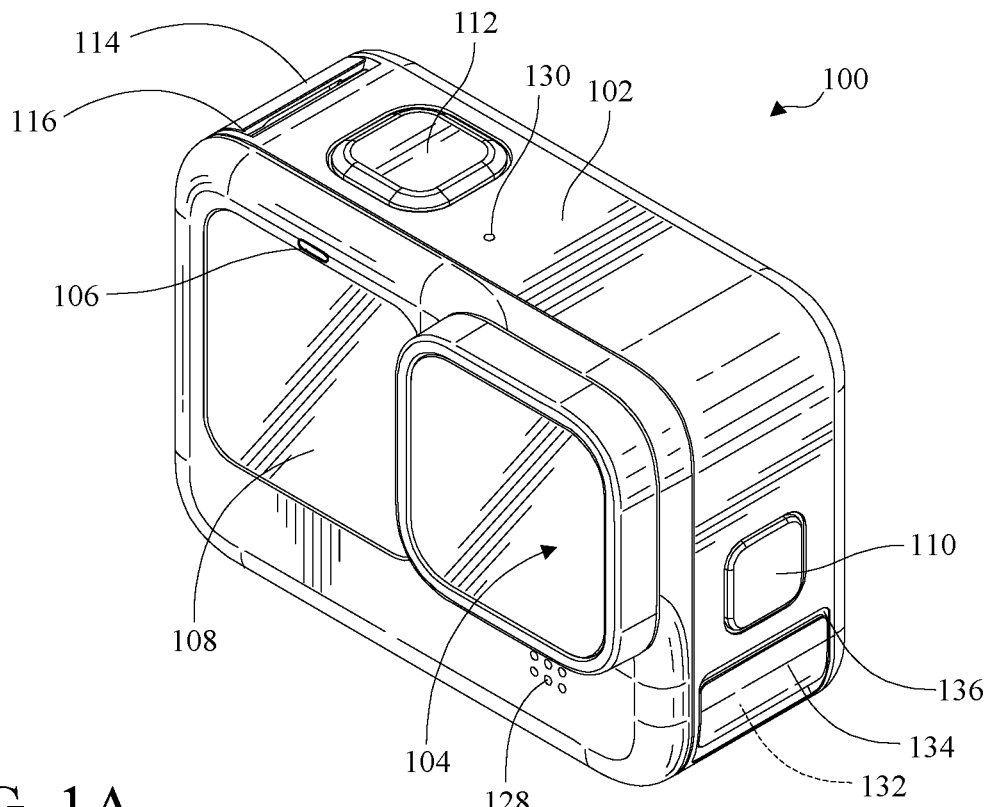
FIGS. 1A-B are isometric views of an example of an image capture apparatus.

HDR mode in digital cameras can be used to capture a wider range of brightness and color than traditional photography. In the HDR mode, two images of a same scene may be captured at different exposure levels. The two images are then combined into a single image resulting in the greater range. Ghosting is a common problem in the HDR mode. Ghosting occurs when objects in the scene are captured at slightly different times in each of the two images used to create the single HDR image. The objects may themselves be moving and/or the camera may move (e.g., due to camera shake). This can result in a blurry or distorted image with duplicate or incomplete objects. To reduce ghosting in the HDR mode, traditional techniques may use a shorter exposure time for each of the two images therewith reducing the chance that objects will move significantly between shots. However, ghosting may remain.

In a further improvement over traditional techniques, a pair of images is obtained such that the images are overlapped in time therewith reducing their temporal distance and limiting the amount of motion therebetween. The images are then fused with an anti-ghosting mechanism into a higher dynamic range image. One of the images is referred to as a long-exposure image and the other is referred as a short-exposure image to reflect the duration of camera sensor exposure for each of the images. The sensor is exposed and read out in an overlapping way. After having exposed and readout a particular line for the sensor for the long-exposure image, the same line can be exposed for the short-exposure image. Accordingly, different lines of the sensor may be read out in an interleaved way: one line for the long-exposure image and another line for the short-exposure image.

Using this interleaving technique, it is possible to start exposing the short-exposure image before the long-exposure image is fully exposed. This results in the long-exposure and the short-exposure images being temporally closer than if the images were sequentially exposed and readout. As such, the amount of motion between them can be reduced, therewith resulting in reduced ghosting artefacts over other traditional techniques. While ghosting is reduced because the delay between the long-exposure and short-exposure images is minimized, the images are still temporally separated and, as such, due to camera and/or object motion, pixels at the same location in both exposures can depict different objects and ghosting artefacts, albeit reduced, may still be present.

Image combinations for high dynamic range processing, as described herein, can synthetically (e.g., artificially) create at least one of a long-exposure image or a short-exposure image out of other images having respective exposure durations by combining some of the other images. The combining can be in such a way as to result in the short-exposure image being temporally in the middle of the long-exposure image, which can be useful for video stabilization. In some implementations, the other images may be captured using an image sensor during overlapping and/or consecutive periods of time. In an example, the image sensor may be a digital overlap (DOL) image sensor.

Image combinations for high dynamic range processing can further reduce ghosting in HDR mode by minimizing the time separation (i.e., the time shift) between the (artificially created) long-exposure image and the (artificially created) short-exposure image used in obtaining an HDR image. The time separation is minimized by redefining the semantics of what is a long-exposure image and what is a short-exposure image. The long-exposure image and the short-exposure image can be obtained (e.g., constructed) using at least three images. Each of at least three images can have a different exposure duration.

Figure 1B:
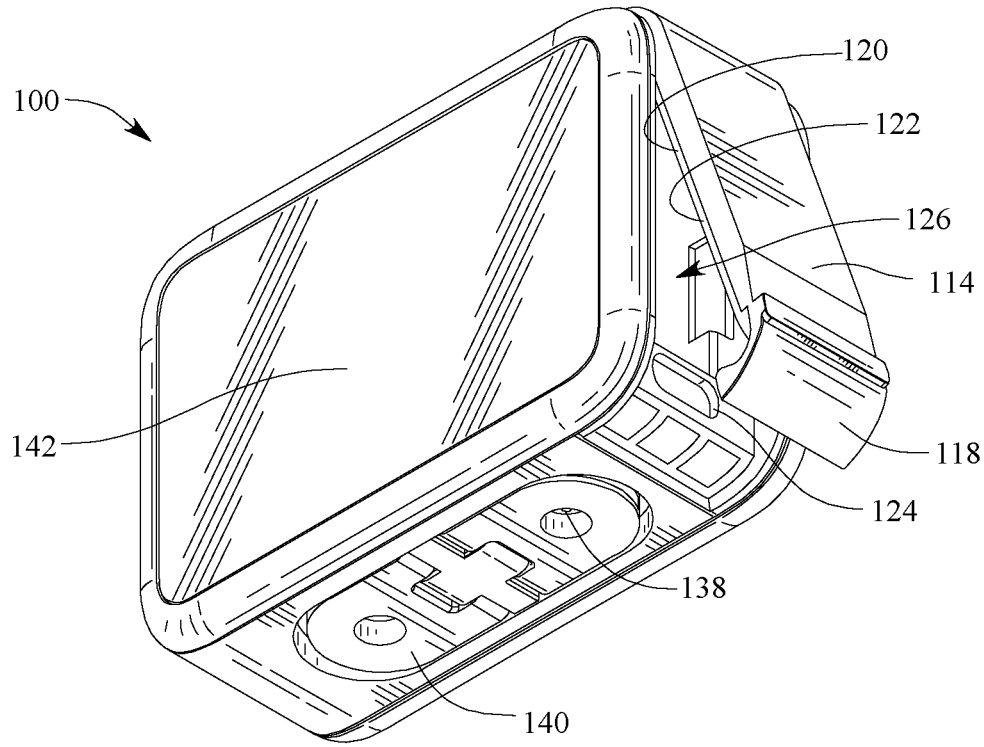
Figure 5:
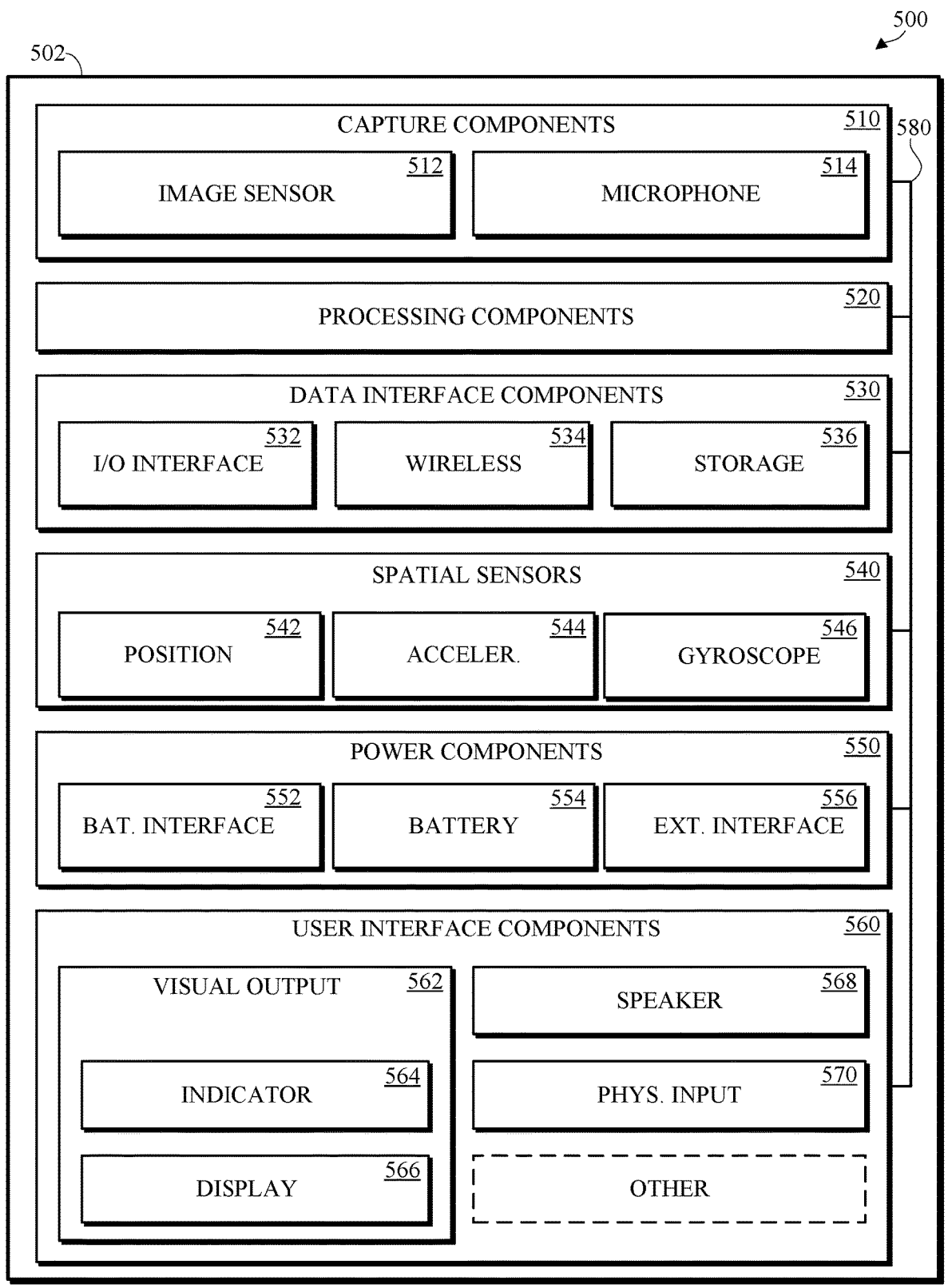
FIG. 5 is a block diagram of electronic components of an image capture apparatus.

FIGS. 1A-B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-B, the image capture apparatus 100 includes internal electronics, such as imaging electronics, power electronics, and the like, internal to the body 102 for capturing images and performing other functions of the image capture apparatus 100. An example showing internal electronics is shown in FIG. 5. The arrangement of the components of the image capture apparatus 100 shown in FIGS. 1A-B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptacle 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
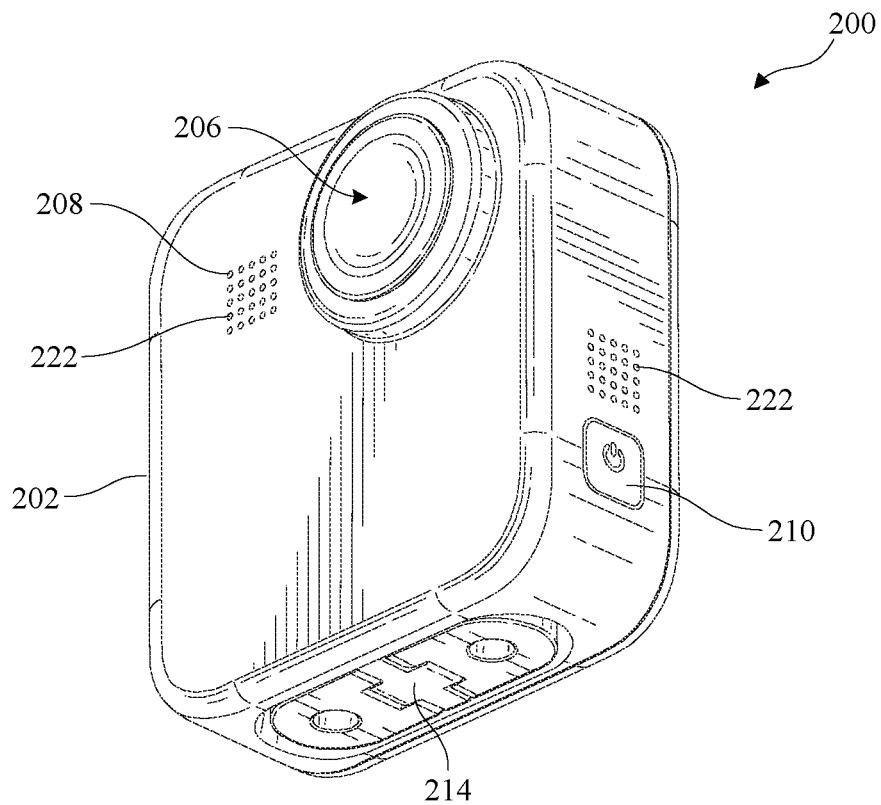
FIGS. 2A-B are isometric views of another example of an image capture apparatus.
Figure 2B:
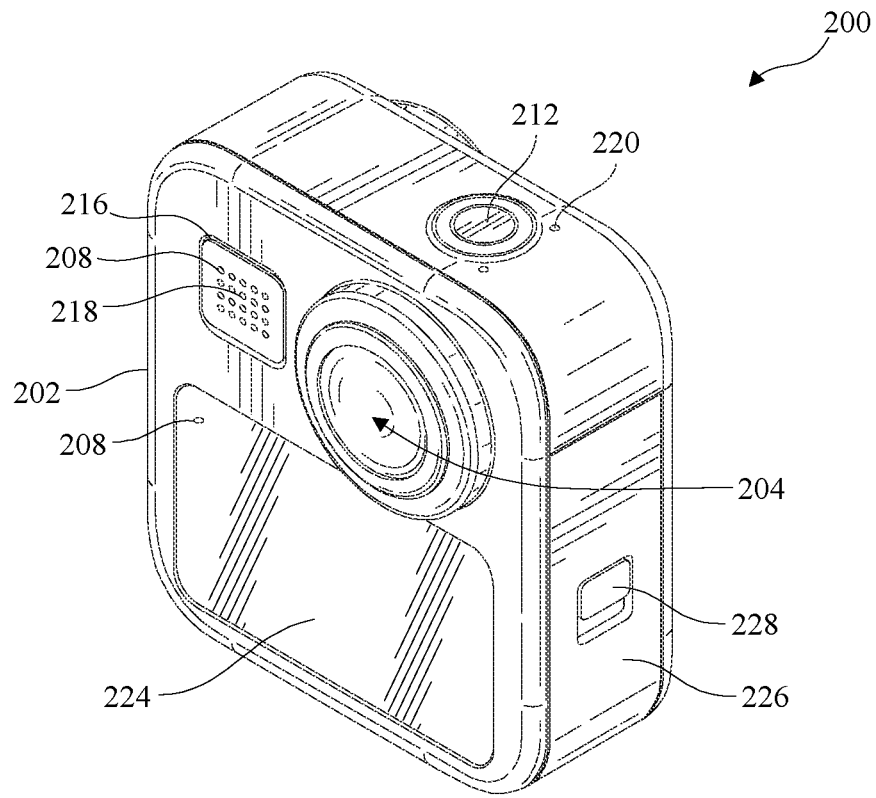

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
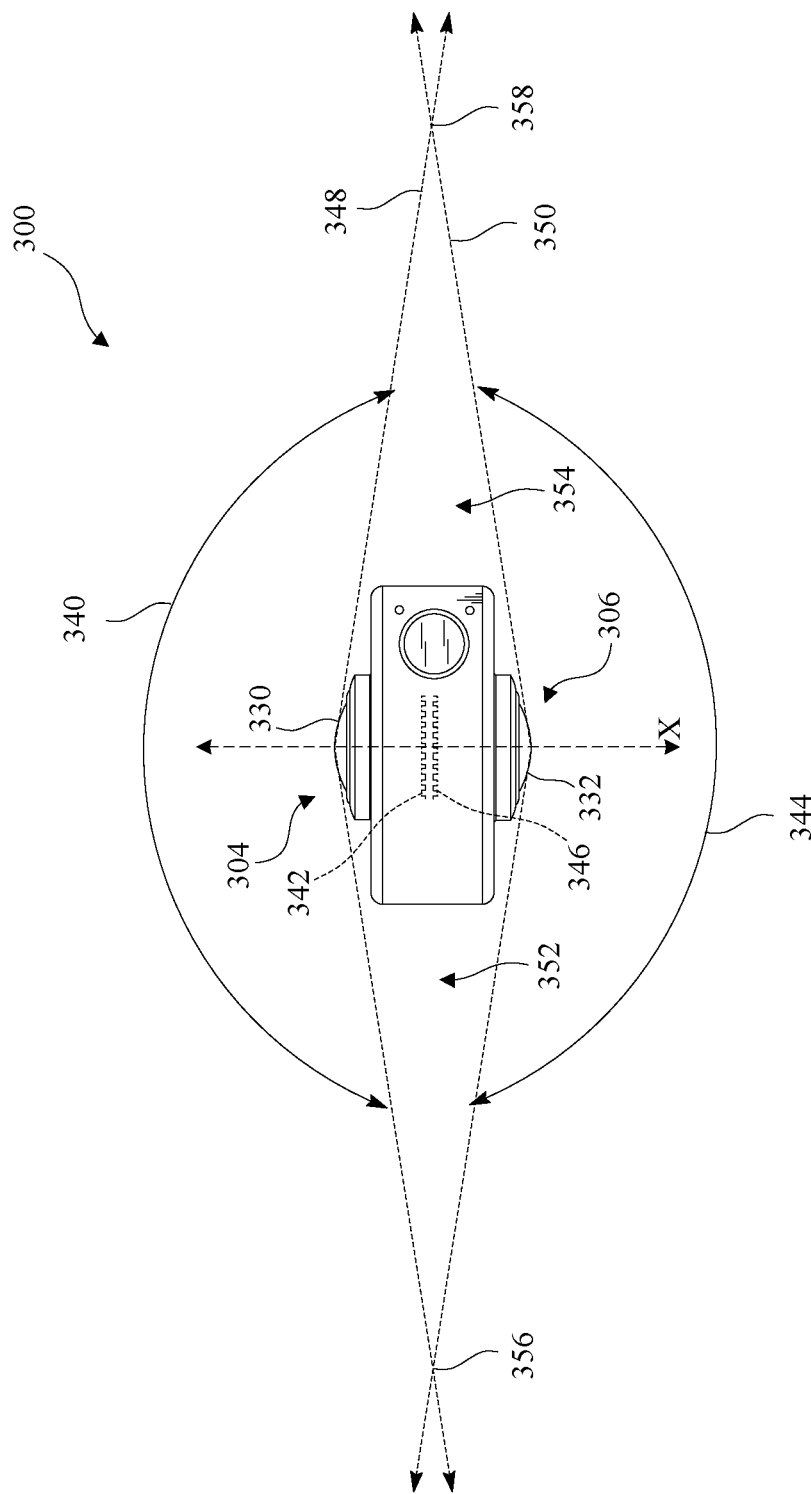
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions, and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The lenses 330, 332 may be aligned along an axis X as shown, laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4A:
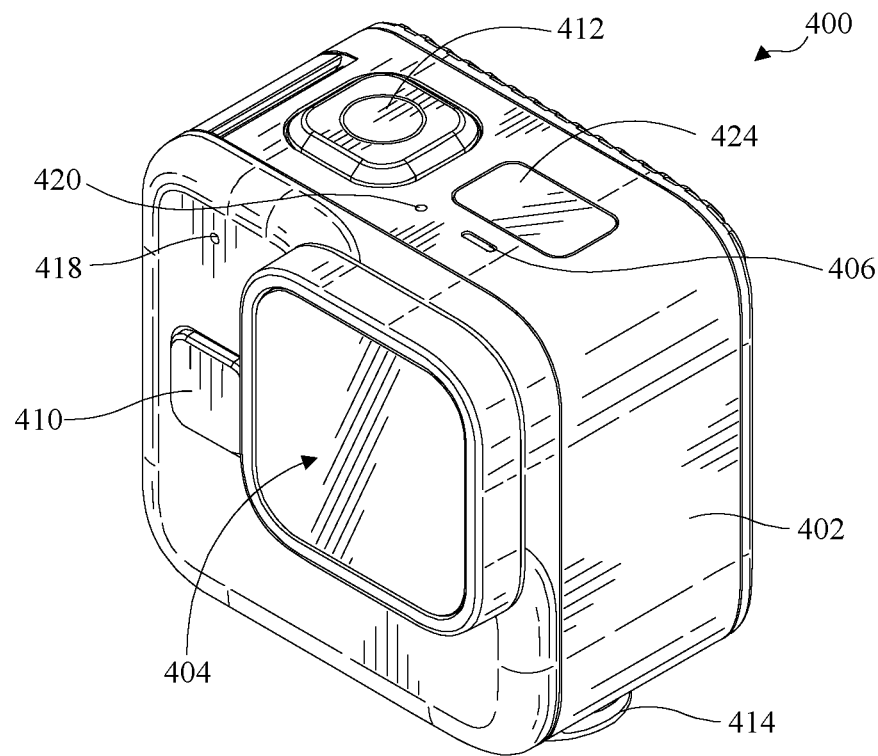
FIGS. 4A-4B are isometric views of another example of an image capture apparatus.
Figure 4B:
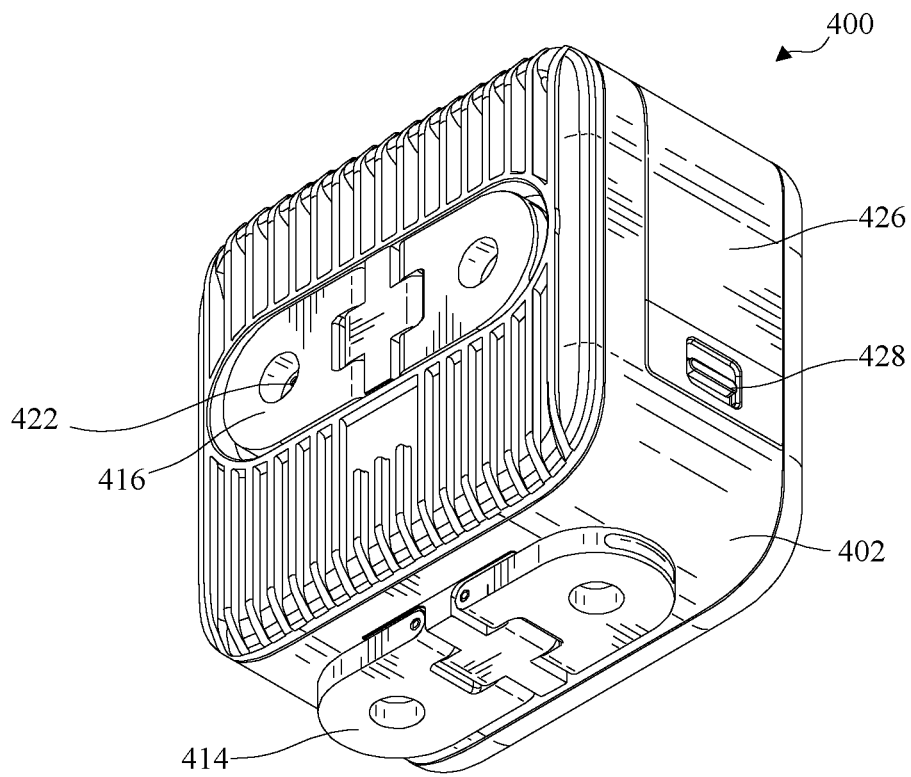

FIGS. 4A-4B illustrate another example of an image capture apparatus 400. The image capture apparatus 400 is similar to the image capture apparatus 100 shown in FIGS. 1A-1B and to the image capture apparatus 200 shown in FIGS. 2A-2B. The image capture apparatus 400 includes a body 402, an image capture device 404, an indicator 406, a mode button 410, a shutter button 412, interconnect mechanisms 414, 416, audio components 418, 420, 422, a display 424, and a door 426 including a release mechanism 428. The arrangement of the components of the image capture apparatus 400 shown in FIGS. 4A-4B is an example, other arrangements of elements may be used.

The body 402 of the image capture apparatus 400 may be similar to the body 102 shown in FIGS. 1A-1B. The image capture device 404 is structured on a front surface of the body 402. The image capture device 404 includes a lens and may be similar to the image capture device 104 shown in FIG. 1A.

As shown in FIG. 4A, the image capture apparatus 400 includes the indicator 406 on a top surface of the body 402. The indicator 406 may be similar to the indicator 106 shown in FIG. 1A. The indicator 406 may indicate a status of the image capture device 204. Although one indicator 406 is shown in FIGS. 4A, the image capture apparatus 400 may include other indictors structured on respective surfaces of the body 402.

As shown in FIGS. 4A, the image capture apparatus 400 includes input mechanisms including the mode button 410, structured on a front surface of the body 402, and the shutter button 412, structured on a top surface of the body 402. The mode button 410 may be similar to the mode button 110 shown in FIG. 1B. The shutter button 412 may be similar to the shutter button 112 shown in FIG. 1A.

The image capture apparatus 400 includes internal electronics (not expressly shown), such as imaging electronics, power electronics, and the like, internal to the body 402 for capturing images and performing other functions of the image capture apparatus 400. An example showing internal electronics is shown in FIG. 5.

As shown in FIGS. 4A-4B, the image capture apparatus 400 includes the interconnect mechanisms 414, 416, with a first interconnect mechanism 414 structured on a bottom surface of the body 402 and a second interconnect mechanism 416 disposed within a rear surface of the body 402. The interconnect mechanisms 414, 416 may be similar to the interconnect mechanism 140 shown in FIG. 1B and the interconnect mechanism 214 shown in FIG. 2A.

As shown in FIGS. 4A-4B, the image capture apparatus 400 includes the audio components 418, 420, 422 respectively structured on respective surfaces of the body 402. The audio components 418, 420, 422 may be similar to the microphones 128, 130, 132 and the speaker 138 shown in FIGS. 1A-1B. One or more of the audio components 418, 420, 422 may be, or may include, audio sensors, such as microphones, to receive and record audio signals, such as voice commands or other audio, in conjunction with capturing images or video. One or more of the audio components 418, 420, 422 may be, or may include, an audio presentation component that may present, or play, audio, such as to provide notifications or alerts.

As shown in FIGS. 4A-4B, a first audio component 418 is located on a front surface of the body 402, a second audio component 420 is located on a top surface of the body 402, and a third audio component 422 is located on a rear surface of the body 402. Other numbers and configurations for the audio components 418, 420, 422 may be used.

As shown in FIG. 4A, the image capture apparatus 400 includes the display 424 structured on a front surface of the body 402. The display 424 may be similar to the displays 108, 142 shown in FIGS. 1A-1B. The display 424 may include an I/O interface. The display 424 may receive touch inputs. The display 424 may display image information during video capture. The display 424 may provide status information to a user, such as status information indicating battery power level, memory card capacity, time elapsed for a recorded video, etc. The image capture apparatus 400 may include multiple displays structured on respective surfaces of the body 402. In some implementations, the display 424 may be omitted or combined with another component of the image capture apparatus 200.

As shown in FIG. 4B, the image capture apparatus 400 includes the door 426 structured on, or forming a portion of, the side surface of the body 402. The door 426 may be similar to the door 226 shown in FIG. 2B. The door 426 shown in FIG. 4B includes the release mechanism 428. The release mechanism 428 may include a latch, a button, or other mechanism configured to receive a user input that allows the door 426 to change position. The release mechanism 428 may be used to open the door 426 for a user to access a battery, a battery receptacle, an I/O interface, a memory card interface, etc.

In some embodiments, the image capture apparatus 400 may include features or components other than those described herein, some features or components described herein may be omitted, or some features or components described herein may be combined. For example, the image capture apparatus 400 may include additional interfaces or different interface features, interchangeable lenses, cold shoes, or hot shoes.

FIG. 5 is a block diagram of electronic components in an image capture apparatus 500. The image capture apparatus 500 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-B, the image capture apparatus 200 shown in FIGS. 2A-B, the image capture apparatus 300 shown in FIG. 3, or the image capture apparatus 400 shown in FIGS. 4A-4B, may be implemented as shown in FIG. 5.

The image capture apparatus 500 includes a body 502. The body 502 may be similar to the body 102 shown in FIGS. 1A-1B, the body 202 shown in FIGS. 2A-2B, or the body 402 shown in FIGS. 4A-4B. The body 502 includes electronic components such as capture components 510, processing components 520, data interface components 530, spatial sensors 540, power components 550, user interface components 560, and a bus 580.

The capture components 510 include an image sensor 512 for capturing images. Although one image sensor 512 is shown in FIG. 5, the capture components 510 may include multiple image sensors. The image sensor 512 may be similar to the image sensors 342, 346 shown in FIG. 3. The image sensor 512 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 512 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 512 captures detected light as image data and conveys the captured image data as electrical signals (image signals or image data) to the other components of the image capture apparatus 500, such as to the processing components 520, such as via the bus 580.

The capture components 510 include a microphone 514 for capturing audio. Although one microphone 514 is shown in FIG. 5, the capture components 510 may include multiple microphones. The microphone 514 detects and captures, or records, sound, such as sound waves incident upon the microphone 514. The microphone 514 may detect, capture, or record sound in conjunction with capturing images by the image sensor 512. The microphone 514 may detect sound to receive audible commands to control the image capture apparatus 500. The microphone 514 may be similar to the microphones 128, 130, 132 shown in FIGS. 1A-1B, the audio components 218, 220, 222 shown in FIGS. 2A-2B, or the audio components 418, 420, 422 shown in FIGS. 4A-4B.

The processing components 520 perform image signal processing, such as filtering, tone mapping, or stitching, to generate, or obtain, processed images, or processed image data, based on image data obtained from the image sensor 512. The processing components 520 may include one or more processors having single or multiple processing cores. In some implementations, the processing components 520 may include, or may be, an application specific integrated circuit (ASIC) or a digital signal processor (DSP). For example, the processing components 520 may include a custom image signal processor. The processing components 520 conveys data, such as processed image data, with other components of the image capture apparatus 500 via the bus 580. In some implementations, the processing components 520 may include an encoder, such as an image or video encoder that may encode, decode, or both, the image data, such as for compression coding, transcoding, or a combination thereof.

Although not shown expressly in FIG. 5, the processing components 520 may include memory, such as a random-access memory (RAM) device, which may be non-transitory computer-readable memory. The memory of the processing components 520 may include executable instructions and data that can be accessed by the processing components 520.

The data interface components 530 communicates with other, such as external, electronic devices, such as a remote control, a smartphone, a tablet computer, a laptop computer, a desktop computer, or an external computer storage device. For example, the data interface components 530 may receive commands to operate the image capture apparatus 500. In another example, the data interface components 530 may transmit image data to transfer the image data to other electronic devices. The data interface components 530 may be configured for wired communication, wireless communication, or both. As shown, the data interface components 530 include an I/O interface 532, a wireless data interface 534, and a storage interface 536. In some implementations, one or more of the I/O interface 532, the wireless data interface 534, or the storage interface 536 may be omitted or combined.

The I/O interface 532 may send, receive, or both, wired electronic communications signals. For example, the I/O interface 532 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 532 is shown in FIG. 5, the data interface components 530 include multiple I/O interfaces. The I/O interface 532 may be similar to the data interface 124 shown in FIG. 1B.

The wireless data interface 534 may send, receive, or both, wireless electronic communications signals. The wireless data interface 534 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 534 is shown in FIG. 5, the data interface components 530 include multiple wireless data interfaces. The wireless data interface 534 may be similar to the data interface 124 shown in FIG. 1B.

The storage interface 536 may include a memory card connector, such as a memory card receptacle, configured to receive and operatively couple to a removable storage device, such as a memory card, and to transfer, such as read, write, or both, data between the image capture apparatus 500 and the memory card, such as for storing images, recorded audio, or both captured by the image capture apparatus 500 on the memory card. Although one storage interface 536 is shown in FIG. 5, the data interface components 530 include multiple storage interfaces. The storage interface 536 may be similar to the data interface 124 shown in FIG. 1B.

The spatial, or spatiotemporal, sensors 540 detect the spatial position, movement, or both, of the image capture apparatus 500. As shown in FIG. 5, the spatial sensors 540 include a position sensor 542, an accelerometer 544, and a gyroscope 546. The position sensor 542, which may be a global positioning system (GPS) sensor, may determine a geospatial position of the image capture apparatus 500, which may include obtaining, such as by receiving, temporal data, such as via a GPS signal. The accelerometer 544, which may be a three-axis accelerometer, may measure linear motion, linear acceleration, or both of the image capture apparatus 500. The gyroscope 546, which may be a three-axis gyroscope, may measure rotational motion, such as a rate of rotation, of the image capture apparatus 500. In some implementations, the spatial sensors 540 may include other types of spatial sensors. In some implementations, one or more of the position sensor 542, the accelerometer 544, and the gyroscope 546 may be omitted or combined.

The power components 550 distribute electrical power to the components of the image capture apparatus 500 for operating the image capture apparatus 500. As shown in FIG. 5, the power components 550 include a battery interface 552, a battery 554, and an external power interface 556 (ext. interface). The battery interface 552 (bat. interface) operatively couples to the battery 554, such as via conductive contacts to transfer power from the battery 554 to the other electronic components of the image capture apparatus 500. The battery interface 552 may be similar to the battery receptacle 126 shown in FIG. 1B. The external power interface 556 obtains or receives power from an external source, such as a wall plug or external battery, and distributes the power to the components of the image capture apparatus 500, which may include distributing power to the battery 554 via the battery interface 552 to charge the battery 554. Although one battery interface 552, one battery 554, and one external power interface 556 are shown in FIG. 5, any number of battery interfaces, batteries, and external power interfaces may be used. In some implementations, one or more of the battery interface 552, the battery 554, and the external power interface 556 may be omitted or combined. For example, in some implementations, the external interface 556 and the I/O interface 532 may be combined.

The user interface components 560 receive input, such as user input, from a user of the image capture apparatus 500, output, such as display or present, information to a user, or both receive input and output information, such as in accordance with user interaction with the image capture apparatus 500.

As shown in FIG. 5, the user interface components 560 include visual output components 562 to visually communicate information, such as to present captured images. As shown, the visual output components 562 include an indicator 564 and a display 566. The indicator 564 may be similar to the indicator 106 shown in FIG. 1A, the indicators 208 shown in FIGS. 2A-2B, or the indicator 406 shown in FIG. 4A. The display 566 may be similar to the display 108 shown in FIG. 1A, the display 142 shown in FIG. 1B, the display 224 shown in FIG. 2B, or the display 424 shown in FIG. 4A. Although the visual output components 562 are shown in FIG. 5 as including one indicator 564, the visual output components 562 may include multiple indicators. Although the visual output components 562 are shown in FIG. 5 as including one display 566, the visual output components 562 may include multiple displays. In some implementations, one or more of the indicator 564 or the display 566 may be omitted or combined.

As shown in FIG. 5, the user interface components 560 include a speaker 568. The speaker 568 may be similar to the speaker 138 shown in FIG. 1B, the audio components 218, 220, 222 shown in FIGS. 2A-2B, or the audio components 418, 420, 422 shown in FIGS. 4A-4B. Although one speaker 568 is shown in FIG. 5, the user interface components 560 may include multiple speakers. In some implementations, the speaker 568 may be omitted or combined with another component of the image capture apparatus 500, such as the microphone 514.

As shown in FIG. 5, the user interface components 560 include a physical input interface 570. The physical input interface 570 may be similar to the mode buttons 110, 210, 410 shown in FIGS. 1A, 2A, and 4A or the shutter buttons 112, 212, 412 shown in FIGS. 1A, 2B, and 4A. Although one physical input interface 570 is shown in FIG. 5, the user interface components 560 may include multiple physical input interfaces. In some implementations, the physical input interface 570 may be omitted or combined with another component of the image capture apparatus 500. The physical input interface 570 may be, for example, a button, a toggle, a switch, a dial, or a slider.

As shown in FIG. 5, the user interface components 560 include a broken line border box labeled "other" to indicate that components of the image capture apparatus 500 other than the components expressly shown as included in the user interface components 560 may be user interface components. For example, the microphone 514 may receive, or capture, and process audio signals to obtain input data, such as user input data corresponding to voice commands. In another example, the image sensor 512 may receive, or capture, and process image data to obtain input data, such as user input data corresponding to visible gesture commands. In another example, one or more of the spatial sensors 540, such as a combination of the accelerometer 544 and the gyroscope 546, may receive, or capture, and process motion data to obtain input data, such as user input data corresponding to motion gesture commands.

Figure 6:
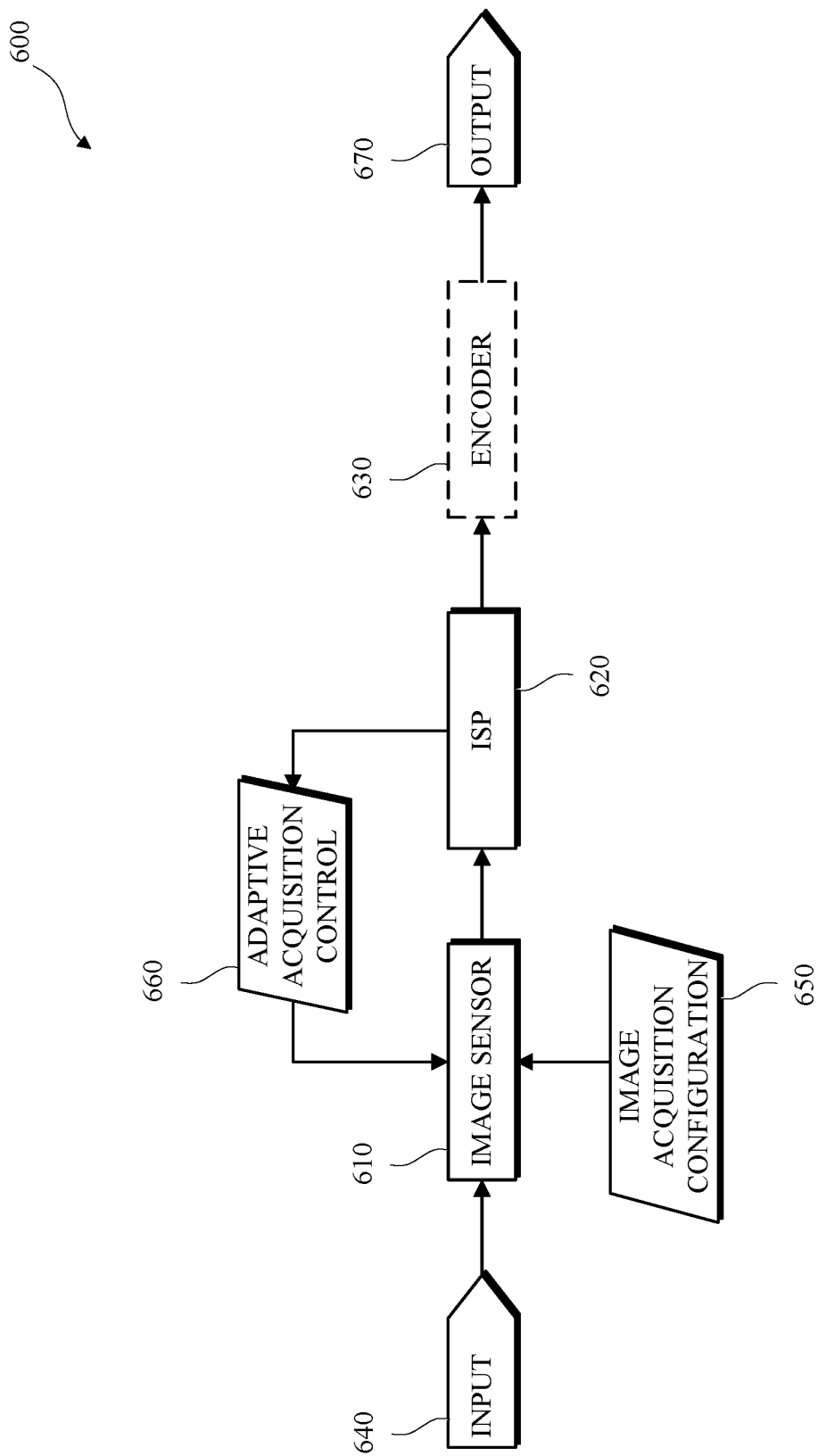
FIG. 6 is a flow diagram of an example of an image processing pipeline.

FIG. 6 is a block diagram of an example of an image processing pipeline 600. The image processing pipeline 600, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, or another image capture apparatus. In some implementations, the image processing pipeline 600 may be implemented in a digital signal processor (DSP), an application-specific integrated circuit (ASIC), or a combination of a digital signal processor and an application-specific integrated circuit. One or more components of the pipeline 600 may be implemented in hardware, software, or a combination of hardware and software.

As shown in FIG. 6, the image processing pipeline 600 includes an image sensor 610, an image signal processor (ISP) 620, and an encoder 630. The encoder 630 is shown with a broken line border to indicate that the encoder may be omitted, or absent, from the image processing pipeline 600. In some implementations, the encoder 630 may be included in another device. In implementations that include the encoder 630, the image processing pipeline 600 may be an image processing and coding pipeline. The image processing pipeline 600 may include components other than the components shown in FIG. 6.

The image sensor 610 receives input 640, such as photons incident on the image sensor 610. The image sensor 610 captures image data (source image data). Capturing source image data includes measuring or sensing the input 640, which may include counting, or otherwise measuring, photons incident on the image sensor 610, such as for a defined temporal duration or period (exposure). Capturing source image data includes converting the analog input 640 to a digital source image signal in a defined format, which may be referred to herein as "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern.

Although one image sensor 610 is shown in FIG. 6, the image processing pipeline 600 may include two or more image sensors. In some implementations, an image, or frame, such as an image, or frame, included in the source image signal, may be one of a sequence or series of images or frames of a video, such as a sequence, or series, of frames captured at a rate, or frame rate, which may be a number or cardinality of frames captured per defined temporal period, such as twenty-four, thirty, sixty, or one-hundred twenty frames per second.

The image sensor 610 obtains image acquisition configuration data 650. The image acquisition configuration data 650 may include image cropping parameters, binning/skipping parameters, pixel rate parameters, bitrate parameters, resolution parameters, framerate parameters, or other image acquisition configuration data or combinations of image acquisition configuration data. Obtaining the image acquisition configuration data 650 may include receiving the image acquisition configuration data 650 from a source other than a component of the image processing pipeline 600. For example, the image acquisition configuration data 650, or a portion thereof, may be received from another component, such as a user interface component, of the image capture apparatus implementing the image processing pipeline 600, such as one or more of the user interface components 560 shown in FIG. 5. The image sensor 610 obtains, outputs, or both, the source image data in accordance with the image acquisition configuration data 650. For example, the image sensor 610 may obtain the image acquisition configuration data 650 prior to capturing the source image.

The image sensor 610 receives, or otherwise obtains or accesses, adaptive acquisition control data 660, such as auto exposure (AE) data, auto white balance (AWB) data, global tone mapping (GTM) data, Auto Color Lens Shading (ACLS) data, color correction data, or other adaptive acquisition control data or combination of adaptive acquisition control data. For example, the image sensor 610 receives the adaptive acquisition control data 660 from the image signal processor 620. The image sensor 610 obtains, outputs, or both, the source image data in accordance with the adaptive acquisition control data 660.

The image sensor 610 controls, such as configures, sets, or modifies, one or more image acquisition parameters or settings, or otherwise controls the operation of the image signal processor 620, in accordance with the image acquisition configuration data 650 and the adaptive acquisition control data 660. For example, the image sensor 610 may capture a first source image using, or in accordance with, the image acquisition configuration data 650, and in the absence of adaptive acquisition control data 660 or using defined values for the adaptive acquisition control data 660, output the first source image to the image signal processor 620, obtain adaptive acquisition control data 660 generated using the first source image data from the image signal processor 620, and capture a second source image using, or in accordance with, the image acquisition configuration data 650 and the adaptive acquisition control data 660 generated using the first source image. In an example, the adaptive acquisition control data 660 may include an exposure duration value and the image sensor 610 may capture an image in accordance with the exposure duration value.

The image sensor 610 outputs source image data, which may include the source image signal, image acquisition data, or a combination thereof, to the image signal processor 620.

The image signal processor 620 receives, or otherwise accesses or obtains, the source image data from the image sensor 610. The image signal processor 620 processes the source image data to obtain input image data. In some implementations, the image signal processor 620 converts the raw image signal (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

Processing the source image data includes generating the adaptive acquisition control data 660. The adaptive acquisition control data 660 includes data for controlling the acquisition of a one or more images by the image sensor 610.

The image signal processor 620 includes components not expressly shown in FIG. 6 for obtaining and processing the source image data. For example, the image signal processor 620 may include one or more sensor input (SEN) components (not shown), one or more sensor readout (SRO) components (not shown), one or more image data compression components, one or more image data decompression components, one or more internal memory, or data storage, components, one or more Bayer-to-Bayer (B2B) components, one or more local motion estimation (LME) components, one or more local motion compensation (LMC) components, one or more global motion compensation (GMC) components, one or more Bayer-to-RGB (B2R) components, one or more image processing units (IPU), one or more high dynamic range (HDR) components, one or more three-dimensional noise reduction (3DNR) components, one or more sharpening components, one or more raw-to-YUV (R2Y) components, one or more Chroma Noise Reduction (CNR) components, one or more local tone mapping (LTM) components, one or more YUV-to-YUV (Y2Y) components, one or more warp and blend components, one or more stitching cost components, one or more scaler components, or a configuration controller. The image signal processor 620, or respective components thereof, may be implemented in hardware, software, or a combination of hardware and software. Although one image signal processor 620 is shown in FIG. 6, the image processing pipeline 600 may include multiple image signal processors. In implementations that include multiple image signal processors, the functionality of the image signal processor 620 may be divided or distributed among the image signal processors.

In some implementations, the image signal processor 620 may implement or include multiple parallel, or partially parallel paths for image processing. For example, for high dynamic range image processing based on two source images, the image signal processor 620 may implement a first image processing path for a first source image and a second image processing path for a second source image, wherein the image processing paths may include components that are shared among the paths, such as memory components, and may include components that are separately included in each path, such as a first sensor readout component in the first image processing path and a second sensor readout component in the second image processing path, such that image processing by the respective paths may be performed in parallel, or partially in parallel.

The image signal processor 620, or one or more components thereof, such as the sensor input components, may perform black-point removal for the image data. In some implementations, the image sensor 610 may compress the source image data, or a portion thereof, and the image signal processor 620, or one or more components thereof, such as one or more of the sensor input components or one or more of the image data decompression components, may decompress the compressed source image data to obtain the source image data.

The image signal processor 620, or one or more components thereof, such as the sensor readout components, may perform dead pixel correction for the image data. The sensor readout component may perform scaling for the image data. The sensor readout component may obtain, such as generate or determine, adaptive acquisition control data, such as auto exposure data, auto white balance data, global tone mapping data, Auto Color Lens Shading data, or other adaptive acquisition control data, based on the source image data.

The image signal processor 620, or one or more components thereof, such as the image data compression components, may obtain the image data, or a portion thereof, such as from another component of the image signal processor 620, compress the image data, and output the compressed image data, such as to another component of the image signal processor 620, such as to a memory component of the image signal processor 620.

The image signal processor 620, or one or more components thereof, such as the image data decompression, or uncompression, components (UCX), may read, receive, or otherwise access, compressed image data and may decompress, or uncompress, the compressed image data to obtain image data. In some implementations, other components of the image signal processor 620 may request, such as send a request message or signal, the image data from an uncompression component, and, in response to the request, the uncompression component may obtain corresponding compressed image data, uncompress the compressed image data to obtain the requested image data, and output, such as send or otherwise make available, the requested image data to the component that requested the image data. The image signal processor 620 may include multiple uncompression components, which may be respectively optimized for uncompression with respect to one or more defined image data formats.

The image signal processor 620, or one or more components thereof, such as the internal memory, or data storage, components. The memory components store image data, such as compressed image data internally within the image signal processor 620 and are accessible to the image signal processor 620, or to components of the image signal processor 620. In some implementations, a memory component may be accessible, such as write accessible, to a defined component of the image signal processor 620, such as an image data compression component, and the memory component may be accessible, such as read accessible, to another defined component of the image signal processor 620, such as an uncompression component of the image signal processor 620.

The image signal processor 620, or one or more components thereof, such as the Bayer-to-Bayer components, which may process image data, such as to transform or convert the image data from a first Bayer format, such as a signed 15-bit Bayer format data, to second Bayer format, such as an unsigned 14-bit Bayer format. The Bayer-to-Bayer components may obtain, such as generate or determine, high dynamic range Tone Control data based on the current image data.

Although not expressly shown in FIG. 6, in some implementations, a respective Bayer-to-Bayer component may include one or more sub-components. For example, the Bayer-to-Bayer component may include one or more gain components. In another example, the Bayer-to-Bayer component may include one or more offset map components, which may respectively apply respective offset maps to the image data. The respective offset maps may have a configurable size, which may have a maximum size, such as 129×129. The respective offset maps may have a non-uniform grid. Applying the offset map may include saturation management, which may preserve saturated areas on respective images based on R, G, and B values. The values of the offset map may be modified per-frame and double buffering may be used for the map values. A respective offset map component may, such as prior to Bayer noise removal (denoising), compensate for non-uniform black point removal, such as due to non-uniform thermal heating of the sensor or image capture device. A respective offset map component may, such as subsequent to Bayer noise removal, compensate for flare, such as flare on hemispherical lenses, and/or may perform local contrast enhancement, such a dehazing or local tone mapping.

In another example, the Bayer-to-Bayer component may include a Bayer Noise Reduction (Bayer NR) component, which may convert image data, such as from a first format, such as a signed 15-bit Bayer format, to a second format, such as an unsigned 14-bit Bayer format. In another example, the Bayer-to-Bayer component may include one or more lens shading (FSHD) component, which may, respectively, perform lens shading correction, such as luminance lens shading correction, color lens shading correction, or both. In some implementations, a respective lens shading component may perform exposure compensation between two or more sensors of a multi-sensor image capture apparatus, such as between two hemispherical lenses. In some implementations, a respective lens shading component may apply map-based gains, radial model gain, or a combination, such as a multiplicative combination, thereof. In some implementations, a respective lens shading component may perform saturation management, which may preserve saturated areas on respective images. Map and lookup table values for a respective lens shading component may be configured or modified on a per-frame basis and double buffering may be used.

In another example, the Bayer-to-Bayer component may include a PZSFT component. In another example, the Bayer-to-Bayer component may include a half-RGB (½ RGB) component. In another example, the Bayer-to-Bayer component may include a color correction (CC) component, which may obtain subsampled data for local tone mapping, which may be used, for example, for applying an unsharp mask. In another example, the Bayer-to-Bayer component may include a Tone Control (TC) component, which may obtain subsampled data for local tone mapping, which may be used, for example, for applying an unsharp mask. In another example, the Bayer-to-Bayer component may include a Gamma (GM) component, which may apply a lookup-table independently per channel for color rendering (gamma curve application). Using a lookup-table, which may be an array, may reduce resource utilization, such as processor utilization, using an array indexing operation rather than more complex computation. The gamma component may obtain subsampled data for local tone mapping, which may be used, for example, for applying an unsharp mask.

In another example, the Bayer-to-Bayer component may include an RGB binning (RGB BIN) component, which may include a configurable binning factor, such as a binning factor configurable in the range from four to sixteen, such as four, eight, or sixteen. One or more sub-components of the Bayer-to-Bayer component, such as the RGB Binning component and the half-RGB component, may operate in parallel. The RGB binning component may output image data, such as to an external memory, which may include compressing the image data. The output of the RGB binning component may be a binned image, which may include low-resolution image data or low-resolution image map data. The output of the RGB binning component may be used to extract statistics for combing images, such as combining hemispherical images. The output of the RGB binning component may be used to estimate flare on one or more lenses, such as hemispherical lenses. The RGB binning component may obtain G channel values for the binned image by averaging Gr channel values and Gb channel values. The RGB binning component may obtain one or more portions of or values for the binned image by averaging pixel values in spatial areas identified based on the binning factor. In another example, the Bayer-to-Bayer component may include, such as for spherical image processing, an RGB-to-YUV component, which may obtain tone mapping statistics, such as histogram data and thumbnail data, using a weight map, which may weight respective regions of interest prior to statistics aggregation.

The image signal processor 620, or one or more components thereof, such as the local motion estimation components, which may generate local motion estimation data for use in image signal processing and encoding, such as in correcting distortion, stitching, and/or motion compensation. For example, the local motion estimation components may partition an image into blocks, arbitrarily shaped patches, individual pixels, or a combination thereof. The local motion estimation components may compare pixel values between frames, such as successive images, to determine displacement, or movement, between frames, which may be expressed as motion vectors (local motion vectors).

The image signal processor 620, or one or more components thereof, such as the local motion compensation components, which may obtain local motion data, such as local motion vectors, and may spatially apply the local motion data to an image to obtain a local motion compensated image or frame and may output the local motion compensated image or frame to one or more other components of the image signal processor 620.

The image signal processor 620, or one or more components thereof, such as the global motion compensation components, may receive, or otherwise access, global motion data, such as global motion data from a gyroscopic unit of the image capture apparatus, such as the gyroscope 546 shown in FIG. 5, corresponding to the current frame. The global motion compensation component may apply the global motion data to a current image to obtain a global motion compensated image, which the global motion compensation component may output, or otherwise make available, to one or more other components of the image signal processor 620.

The image signal processor 620, or one or more components thereof, such as the Bayer-to-RGB components, which convert the image data from Bayer format to an RGB format. The Bayer-to-RGB components may implement white balancing and demosaicing. The Bayer-to-RGB components respectively output, or otherwise make available, RGB format image data to one or more other components of the image signal processor 620.

The image signal processor 620, or one or more components thereof, such as the image processing units, which perform warping, image registration, electronic image stabilization, motion detection, object detection, or the like. The image processing units respectively output, or otherwise make available, processed, or partially processed, image data to one or more other components of the image signal processor 620.

The image signal processor 620, or one or more components thereof, such as the high dynamic range components, may, respectively, generate high dynamic range images based on the current input image, the corresponding local motion compensated frame, the corresponding global motion compensated frame, or a combination thereof. The high dynamic range components respectively output, or otherwise make available, high dynamic range images to one or more other components of the image signal processor 620.

The high dynamic range components of the image signal processor 620 may, respectively, include one or more high dynamic range core components, one or more tone control (TC) components, or one or more high dynamic range core components and one or more tone control components. For example, the image signal processor 620 may include a high dynamic range component that includes a high dynamic range core component and a tone control component. The high dynamic range core component may obtain, or generate, combined image data, such as a high dynamic range image, by merging, fusing, or combining the image data, such as unsigned 14-bit RGB format image data, for multiple, such as two, images (HDR fusion) to obtain, and output, the high dynamic range image, such as in an unsigned 23-bit RGB format (full dynamic data). The high dynamic range core component may output the combined image data to the Tone Control component, or to other components of the image signal processor 620. The Tone Control component may compress the combined image data, such as from the unsigned 23-bit RGB format data to an unsigned 17-bit RGB format (enhanced dynamic data).

The image signal processor 620, or one or more components thereof, such as the three-dimensional noise reduction components reduce image noise for a frame based on one or more previously processed frames and output, or otherwise make available, noise reduced images to one or more other components of the image signal processor 620. In some implementations, the three-dimensional noise reduction component may be omitted or may be replaced by one or more lower-dimensional noise reduction components, such as by a spatial noise reduction component. The three-dimensional noise reduction components of the image signal processor 620 may, respectively, include one or more temporal noise reduction (TNR) components, one or more raw-to-raw (R2R) components, or one or more temporal noise reduction components and one or more raw-to-raw components. For example, the image signal processor 620 may include a three-dimensional noise reduction component that includes a temporal noise reduction component and a raw-to-raw component.

The image signal processor 620, or one or more components thereof, such as the sharpening components, obtains sharpened image data based on the image data, such as based on noise reduced image data, which may recover image detail, such as detail reduced by temporal denoising or warping. The sharpening components respectively output, or otherwise make available, sharpened image data to one or more other components of the image signal processor 620.

The image signal processor 620, or one or more components thereof, such as the raw-to-YUV components, may transform, or convert, image data, such as from the raw image format to another image format, such as the YUV format, which includes a combination of a luminance (Y) component and two chrominance (UV) components. The raw-to-YUV components may, respectively, demosaic, color process, or a both, images.

Although not expressly shown in FIG. 6, in some implementations, a respective raw-to-YUV component may include one or more sub-components. For example, the raw-to-YUV component may include a white balance (WB) component, which performs white balance correction on the image data. In another example, a respective raw-to-YUV component may include one or more color correction components (CC0, CC1), which may implement linear color rendering, which may include applying a 3×3 color matrix. For example, the raw-to-YUV component may include a first color correction component (CC0) and a second color correction component (CC1). In another example, a respective raw-to-YUV component may include a three-dimensional lookup table component, such as subsequent to a first color correction component. Although not expressly shown in FIG. 6, in some implementations, a respective raw-to-YUV component may include a Multi-Axis Color Correction (MCC) component, such as subsequent to a three-dimensional lookup table component, which may implement non-linear color rendering, such as in Hue, Saturation, Value (HSV) space.

In another example, a respective raw-to-YUV component may include a black point RGB removal (BPRGB) component, which may process image data, such as low intensity values, such as values within a defined intensity threshold, such as less than or equal to, 28, to obtain histogram data wherein values exceeding a defined intensity threshold may be omitted, or excluded, from the histogram data processing. In another example, a respective raw-to-YUV component may include a Multiple Tone Control (Multi-TC) component, which may convert image data, such as unsigned 17-bit RGB image data, to another format, such as unsigned 14-bit RGB image data. The Multiple Tone Control component may apply dynamic tone mapping to the Y channel (luminance) data, which may be based on, for example, image capture conditions, such as light conditions or scene conditions. The tone mapping may include local tone mapping, global tone mapping, or a combination thereof.

In another example, a respective raw-to-YUV component may include a Gamma (GM) component, which may convert image data, such as unsigned 14-bit RGB image data, to another format, such as unsigned 10-bit RGB image data. The Gamma component may apply a lookup-table independently per channel for color rendering (gamma curve application). Using a lookup-table, which may be an array, may reduce resource utilization, such as processor utilization, using an array indexing operation rather than more complex computation. In another example, a respective raw-to-YUV component may include a three-dimensional lookup table (3DLUT) component, which may include, or may be, a three-dimensional lookup table, which may map RGB input values to RGB output values through a non-linear function for non-linear color rendering. In another example, a respective raw-to-YUV component may include a Multi-Axis Color Correction (MCC) component, which may implement non-linear color rendering. For example, the multi-axis color correction component may perform color non-linear rendering, such as in Hue, Saturation, Value (HSV) space.

The image signal processor 620, or one or more components thereof, such as the Chroma Noise Reduction (CNR) components, may perform chroma denoising, luma denoising, or both.

The image signal processor 620, or one or more components thereof, such as the local tone mapping components, may perform multi-scale local tone mapping using a single pass approach or a multi-pass approach on a frame at different scales. The local tone mapping components may, respectively, enhance detail and may omit introducing artifacts. For example, the Local Tone Mapping components may, respectively, apply tone mapping, which may be similar to applying an unsharp-mask. Processing an image by the local tone mapping components may include obtaining, processing, such as in response to gamma correction, tone control, or both, and using a low-resolution map for local tone mapping.

The image signal processor 620, or one or more components thereof, such as the YUV-to-YUV (Y2Y) components, may perform local tone mapping of YUV images. In some implementations, the YUV-to-YUV components may include multi-scale local tone mapping using a single pass approach or a multi-pass approach on a frame at different scales.

The image signal processor 620, or one or more components thereof, such as the warp and blend components, may warp images, blend images, or both. In some implementations, the warp and blend components may warp a corona around the equator of a respective frame to a rectangle. For example, the warp and blend components may warp a corona around the equator of a respective frame to a rectangle based on the corresponding low-resolution frame. The warp and blend components, may, respectively, apply one or more transformations to the frames, such as to correct for distortions at image edges, which may be subject to a close to identity constraint.

The image signal processor 620, or one or more components thereof, such as the stitching cost components, may generate a stitching cost map, which may be represented as a rectangle having disparity (x) and longitude (y) based on a warping. Respective values of the stitching cost map may be a cost function of a disparity (x) value for a corresponding longitude. Stitching cost maps may be generated for various scales, longitudes, and disparities.

The image signal processor 620, or one or more components thereof, such as the scaler components, may scale images, such as in patches, or blocks, of pixels, such as 16×16 blocks, 8×8 blocks, or patches or blocks of any other size or combination of sizes.

The image signal processor 620, or one or more components thereof, such as the configuration controller, may control the operation of the image signal processor 620, or the components thereof.

The image signal processor 620 outputs processed image data, such as by storing the processed image data in a memory of the image capture apparatus, such as external to the image signal processor 620, or by sending, or otherwise making available, the processed image data to another component of the image processing pipeline 600, such as the encoder 630, or to another component of the image capture apparatus.

The encoder 630 encodes or compresses the output of the image signal processor 620. In some implementations, the encoder 630 implements one or more encoding standards, which may include motion estimation. The encoder 630 outputs the encoded processed image to an output 670. In an embodiment that does not include the encoder 630, the image signal processor 620 outputs the processed image to the output 670. The output 670 may include, for example, a display, such as a display of the image capture apparatus, such as one or more of the displays 108, 142 shown in FIGS. 1A-1B, the display 224 shown in FIG. 2B, the display 424 shown in FIG. 4A, or the display 566 shown in FIG. 5, to a storage device, or both. The output 670 is a signal, such as to an external device.

Figure 7:
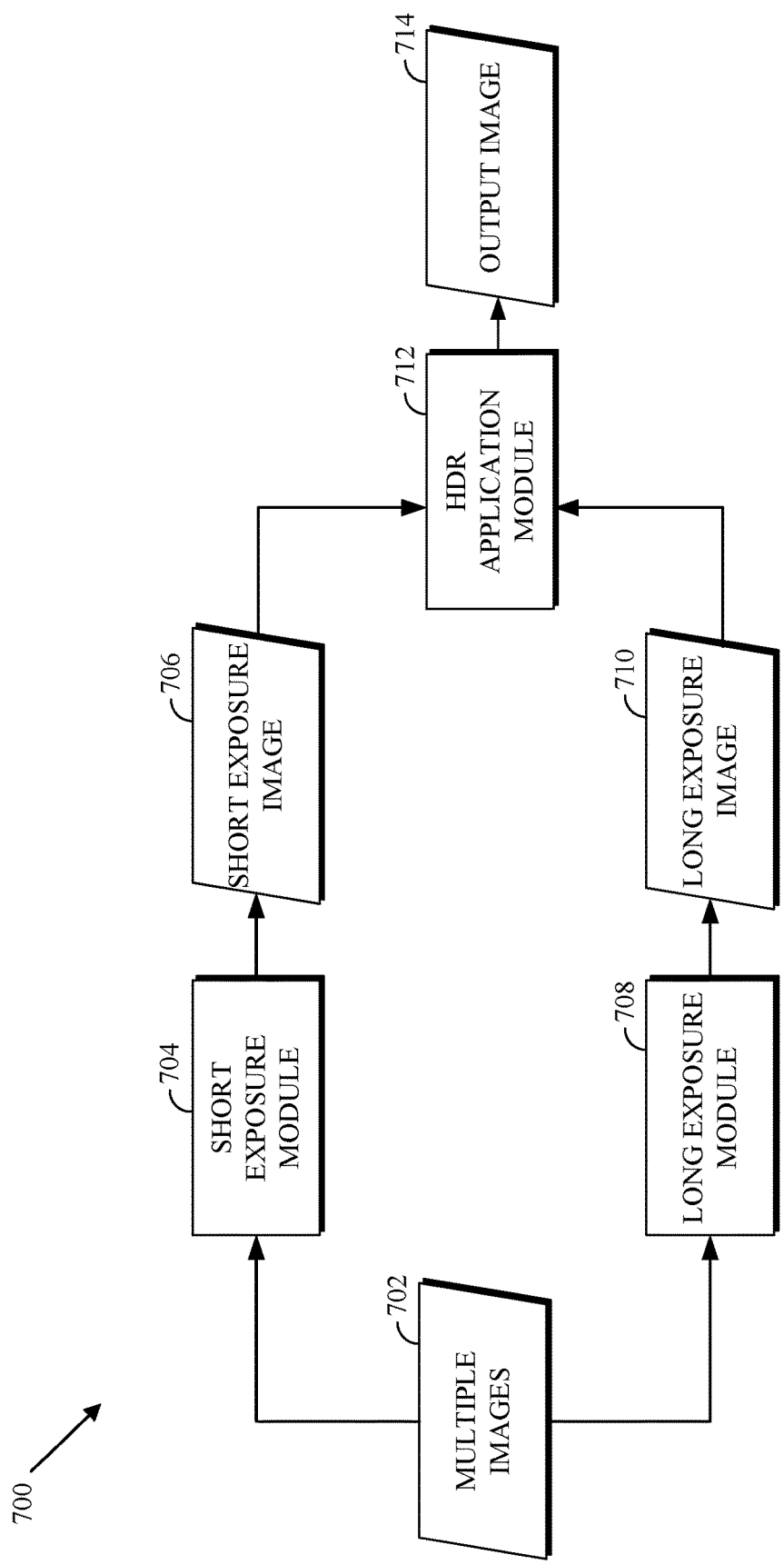
FIG. 7 is block diagram of an example of a system for generating a long-exposure image and a short-exposure image for HDR processing.

FIG. 7 is block diagram of an example of a system 700 for generating a long-exposure image and a short-exposure image for HDR processing. The system 700 can be implemented in or by an image capture apparatus, such as the image capture apparatus 100 of FIG. 1, the image capture apparatus 200 of FIG. 2, the image capture apparatus 300 of FIG. 3, the image capture apparatus 400 of FIG. 4, or the image capture apparatus 500 of FIG. 5. The system 700 can be implemented in an image processing pipeline, such as the pipeline 600 of FIG. 6. In an example, the system 700 may be at least partially implemented by an ISP, such as the ISP 620 of FIG. 6. The system 700 may be implemented in software as executable instructions or may be implemented in hardware. For example, the system 700 may be implemented as hardware and/or software of a processing component (e.g., one of the processing components 520). The processing component can be, or can be attached to, the image sensor.

The system 700 is configured to receive multiple images 702 as input. The multiple images 702 include at least three images. The multiple images 702 are captured using an image sensor (e.g., the first image sensor 342, the second image sensor 346, the image sensor 512, the image sensor 610, or some other sensor). The system 700 includes a short exposure module 704, a long exposure module 708, and an HDR application module 712.

The short exposure module 704 is configured to obtain from (e.g., extract from, construct from, select, use, etc.) at least one of the multiple images 702 as a short-exposure image 706. The long exposure module 708 is configured to obtain from (e.g., extract from, construct from, select, use, etc.) a long-exposure image 710 from a subset of the multiple images 702. The long exposure module 708 can be configured to obtain the long-exposure image 710 in such a way that the exposure duration of the long-exposure image 710 is longer than the exposure duration of the short-exposure image 706.

The long exposure module 708 can obtain the long-exposure image 710 by combining (e.g., linearly combining) at least two images of the multiple images 702. The short exposure module 704 can obtain the short-exposure image 706 by combining at least two images of the multiple images 702 or using one of the multiple images 702. In an example, the system 700 obtains the short-exposure image 706 and the long-exposure image 710 such that the short-exposure image 706 is temporally substantially in the middle of the long-exposure image 710, which can improve video stabilization. As is known, combining at least two images can include adding corresponding pixel values from the at least two images. The addition of pixel values may be understood as the addition of the number of received photons by the pixels.

The HDR application module 712 is configured to apply high dynamic range processing to the short-exposure image 706 and the long-exposure image 710 to obtain an output image 714 with a larger dynamic range than that of at least the short-exposure image 706. The system 700 may be configured to implement one or more of the techniques 1100, 1200, or 1300 of FIG. 11, 12, or 13, respectively.

In an example, the long exposure module 708 may be configured to receive (e.g., via the bus 580 or a communications link) at least a first subset of the multiple images 702 and obtain the long-exposure image 710 based on the at least the first subset of the multiple images 702. In an example, the short exposure module 704 may be configured to receive (e.g., via the bus 580 or the communications link) at least a second subset of the multiple images 702 and obtain the short-exposure image 706 based on the at least the second subset of the multiple images 702. In an example, the first subset and the second subset of the multiple images 702 may overlap (e.g. have a non-empty intersection).

In some implementations, the image sensor is a digital overlap high dynamic range (DOL-HDR) sensor, and the processing component is configured to receive at least some of the multiple images 702 in an interleaved pattern of image portions, such that exposure of an image portion of one image commences when pixels of a same image portion of another image are read and reset. For example, the image portion may be a row of pixels. In an example, and as further described herein, the image sensor can be configured for simultaneous, rather than or in addition to, interleaved exposure(s). Configurations of image sensors usable with or by the system 700 are further described with respect to FIGS. 8-10.

The HDR application module 712 may perform a fusion operation to combine the short-exposure image 706 and the long-exposure image 710 to obtain an output image 714. Pixels of the long-exposure image 710 that are saturated may be replaced by corresponding pixels of the short-exposure image 706 in the output image 714, and pixels of the output image 714 may be determined based on corresponding pixels of the long-exposure image 710 where those pixels of the long-exposure image 710 are not saturated. In some implementations (not shown in FIG. 7), the HDR application module 712 may be configured to apply high dynamic range processing to select among pixels from the short-exposure image 706, one of the multiple images 702, and the long-exposure image 710. The HDR application module 712 may use weights in pixel-wise combining of pixels of the short-exposure image 706 and the long-exposure image 710. The weights can depend on the saturation of the images and ghosting detection, which may due to camera motion. The HDR application module 712 can employ any number of strategies or techniques that aim to maximize the Signal-to-Noise Ratio (SNR) in dark areas and/or preserve details in light areas while avoiding ghosting artefacts. As such, after the fusion operation, some pixels of the output image 714 may be set from the short-exposure image 706, some pixels may be set from the long-exposure image 710, and some pixels may be set as a combination of respective pixels from the short-exposure image 706 and the long-exposure image 710.

As already mentioned, one or both of the short exposure module 704 or the long exposure module 708 can be obtained by combining two or more images. Combining two or more images can include zero or more of subtracting black levels, inverse scaling, or gain removal.

Black levels can be subtracted in any number of ways. In an example, the respective pixel values of the two or more images to be combined (such as to obtain the short-exposure image 706 or the long-exposure image 710) can be represented with a non-zero black level. For example, respective black levels identified for at least some of the images may be subtracted from the images prior to adding (combining) the images. An additive black level can be added to the combined pixel values. The additive black level can be an average of the identified respective black levels, a maximum or the minimum of the respective black levels, or some other combination of the respective black levels. In an example, such as where saturations of pixel sums is not an issue in hardware implementations, a black level may be subtracted from a sum of the combined images.

In an example, the two or more images can be combined without scaling or after scaling, such as to reverse gains applied by an upstream portion of an image processing pipeline (e.g., a gain applied by a front image signal processor of the pipeline 600), such that the images of the two or more images are represented in common units. Any such upstream scaling of the pixel values of an image may be removed by applying, for example, an inverse scaling operations.

In the case that a gain is applied and the gain is different for different images, a common gain may be effected for the resulting combined image. Using two images as an illustration, if a first gain ($g_1$) was applied to a first image ($v_1$) and a second gain ($g_2$) was applied to a second image ($v_2$), a common gain ($g$) may be effected for the resulting combined image by adding corresponding pixel values of the first image and the image according to $g \times (v_1/g_1 + v_2/g_2)$ rather than just $v_1 + v_2$. The later formula is equivalent to the former in case $g = g_1 = g_2$.

While not specifically shown in FIG. 7, in some implementations, the system 700 may apply image (e.g., video) stabilization. For example, the output image 714 may be a frame of a video. In an example, a global motion model (GMM) may be obtained (e.g., derived) using motion data, which can be as described with respect to the spatial sensors 540 of FIG. 5. Image stabilization may include applying the GMM to an image, which can include warping or projecting the image based on the GMM.

Motion data associated with a previous image can be compared to the motion data associated with a current image to obtain the GMM. Motion data associated with an image means motion data obtained (e.g., registered, logged, detected, etc.) at the time that the image was captured. The previous image can be one of the multiple images 702 obtained at a time $t_i$ and the current image can be the corresponding image of the multiple images 702 obtained at a time $t_{i+1}$. In an example, the previous image and the current image can be the images of the respective multiple images 702 having the shorted exposure times. However, other images can also be used.

The motion data may indicate a rotational change in the orientation of the field-of-view relative to the content captured in respective images. For example, the motion data may indicate a horizontal change of the field-of-view, which may indicate panning or rotation around a vertical axis of the image capture apparatus. In another example, the motion data may indicate a vertical change of the field-of-view, which may indicate a tilt or rotation around an axis perpendicular to a lens of the image capture apparatus. In another example, the motion data may indicate a rotational change of the field-of-view relative to the horizon, which may indicate that the image capture apparatus rolled or rotated around an axis parallel to the lens. The motion data may indicate a change in the geospatial location of the image capture apparatus, which may include a change associated with changing an elevation of the image capture apparatus. The motion data may also include data indicative of zooming.

In an example, image stabilization may be performed on the output image 714. As such, the GMM can be applied to the output image 714. In another example, image stabilization can be performed prior to the HDR application module 712 receiving the short-exposure image 706 and the long-exposure image 710. In an example, the GMM can be applied to at least one (e.g., both) of the short-exposure image 706 or the long-exposure image 710. In another example, the GMM can be applied to at least some (e.g., each) of the images of the multiple images 702.

Figure 8:
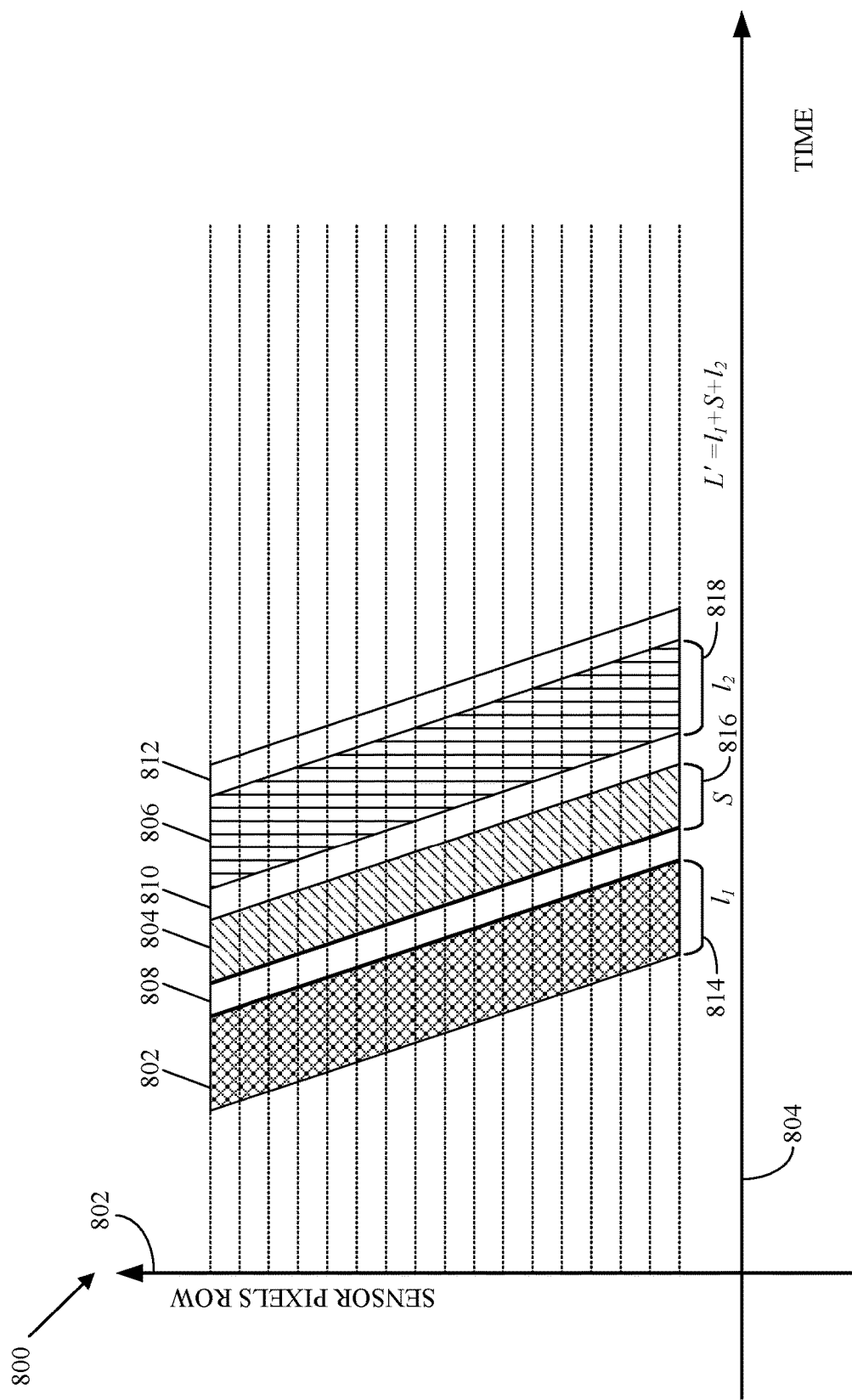
FIG. 8 is an illustration of exposing and reading images used for HDR processing.

FIG. 8 is an illustration 800 of exposing and reading images used for HDR processing. The illustration 800 illustrates the capturing, over time, of rows of pixels on an image sensor (not shown). While not specifically shown, the image sensor can be controlled or configured to reset, expose, and readout different rows of pixels separately. Stated another way, the image sensor can be configured to obtain three different images at independently controlled (e.g., differently configured) exposure times. To illustrate, while one row is being exposed for a first duration (e.g., 10 milliseconds), a second row may be read out, and a third row may be exposed for a second duration (e.g., 8 milliseconds); while one row is being exposed for a first duration (e.g., 10 milliseconds), a second row may be exposed for a second duration (e.g., 8 milliseconds), and a third row may be exposed for a third duration (e.g., 10 milliseconds); and so on. The image sensor can be configured via adaptive acquisition control data, such as the adaptive acquisition control data 660 of FIG. 6.

FIG. 8 illustrates that multiple images are obtained from the image sensor. In the illustration 800, the multiple images include three images: a first image 802, a second image 804, and a third image 806. However, the multiple images can include more than three images. The multiple images can be the multiple images 702 of FIG. 7. FIG. 8 also illustrates that different pixel rows are read out at different times. For example, rows of pixels of the first image 802 can be read during readout periods 808, rows of pixels of the second image 804 can be read during readout periods 810, and rows of pixels of the third image 806 can be read out during readout periods 812.

The first image 802 has a first exposure duration 814 (denoted $l_1$), the second image 804 has a second exposure duration 816 (denoted S), and the third image 818 has a third exposure duration 818 (denoted $l_2$). In an example, the first exposure duration 814 and the third exposure duration 818 can be equal (i.e., $l_1 = l_2$). As such, the second image 804 can fall temporally in the middle (to within a certain precision) of the first image 802 and the third image 806. The exposure start times and the exposure end times of the first image 802, the second image 804, and the third image 806 can be controlled (e.g., configured) to ensure that the second image 804 can fall temporally in the middle between the first image 802 and the third image 806. When the second image 804 is temporarily is the middle of the images 802 and the third image 806, the same motion can be assumed for the short-exposure image 706 and the long-exposure image 710 of FIG. 10, which can result in improved or more accurate motion compensation (e.g., video stabilization).

In an example, the second exposure duration 816 can be less than each of the first exposure duration 814 and the third exposure duration 818 (i.e., $S < l_1$; $S < l_2$). In an example, the first exposure duration 814 can be equal to the third exposure duration and the second exposure duration 816 can be greater than the first exposure duration 814 (i.e., $l_1 = l_2$; $S > l_1$). Other relationships between $l_1$, $l_2$, and S are possible.

As mentioned the first image 802, the second image 804, and the third image 806 can be the multiple images 702 of FIG. 7. In an example, the short exposure module 704 can use the second image 804 as the short-exposure image 706. In an example, the long-exposure image 710 can combine the three images 802, 804, and 806 to obtain the long-exposure image 710. As such, the short-exposure image 706 can have an exposure duration of S; and the long-exposure image 710 can have an exposure duration of $L' = l_1 + S + l_2$.

In some examples, the exposure durations of the multiple images may be selected (e.g., configured) so as to satisfy one or more constraints or guidelines.

In the case of video capture at a particular frame rate, each frame must be captured within a given number of milliseconds. To illustrate, in the case of a frame rate of 30 frames per second, each frame must be captured and processed within, roughly, 33 milliseconds. As such, the exposure times of the multiple images in addition to image sensor relaxation time between exposures (which is typically in the range of microseconds) must be within 33 milliseconds. Thus, in this case, L' must be less than 33 milliseconds.

In an example, an auto-exposure module or algorithm of the camera may analyze one or more previous images to determine auto-exposure parameters to apply to a next image. In the case of HDR processing, the auto-exposure module may identify (e.g., output) a reference long exposure duration (denoted $L_R$) and a reference short exposure duration (denoted $S_R$) for capturing a first nominal image and a second nominal image, respectively, where the first nominal image and the second nominal image would be fused. The system 700 may then configure the image sensor to obtain the multiple images 702 such that, for example, S is equal to the reference short exposure ($S_R$) duration and L' is equal to the reference long exposure duration ($L_R$). In another example, the system 700 can configure the image sensor to obtain the multiple images 702 within the sum of the reference long exposure duration and the reference short exposure duration.

Figure 9:
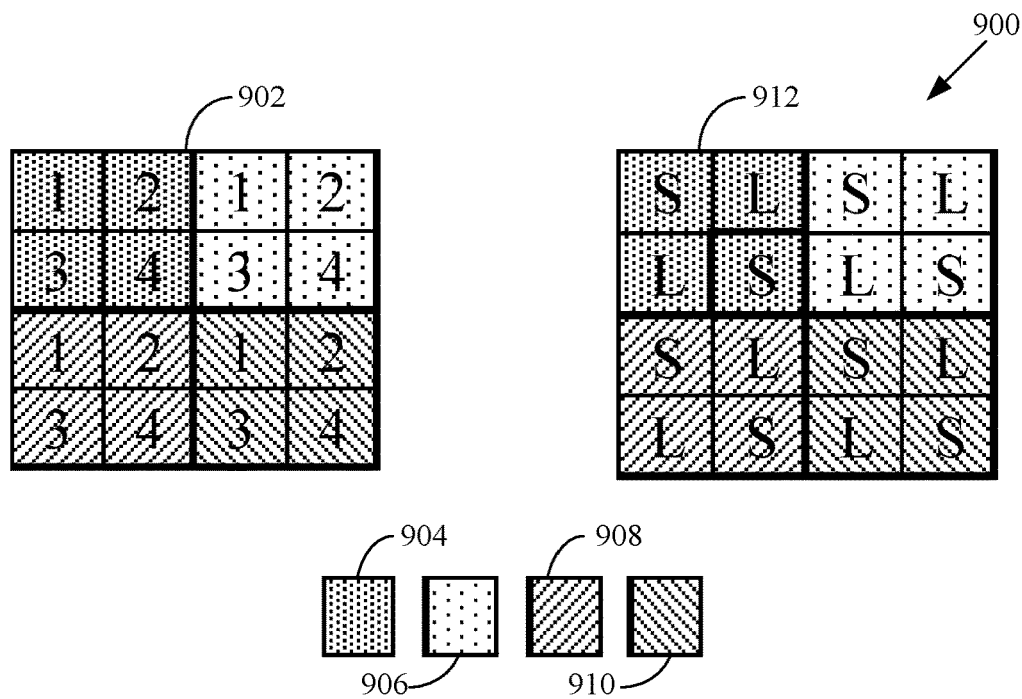
FIG. 9 describes an example of a multi-exposure image sensor for obtaining multiple images for HDR processing.

FIG. 9 describes an example 900 of a multi-exposure image sensor for obtaining multiple images for HDR processing. The multi-exposure sensor described with respect to FIG. 9 can be used to obtain the multiple images 702 of FIG. 7. The image sensor can be the image sensor 610 of FIG. 6. Some image sensors can be configured (e.g., set to different modes) to obtain at least some of the multiple images 702 of FIG. 7 based on a single exposure. Stated another way, a scene can be captured (e.g., imaged) multiple times in a burst of exposures, each with a different exposure level.

In a typical Bayer image sensor, and as described above, each pixel is covered by a single color filter that allows only one color to pass through. The color filter is a standard RGB (Red, Green, Blue) color filter array. The filters are arranged in a repeating pattern of red-green-blue-green (R-G-B-G), with twice as many green filters as red and blue filters.

Other image sensors may use more complex color filter arrays that combine multiple adjacent pixels into a single "super-pixel." A portion 902 of an image sensor illustrates such an image sensor structure where four pixels are grouped into a super-pixel. Each of the super-pixels has four color filters arranged in a 2×2 pattern, with two green filters (corresponding to pixels having patterns 906 and 908), one red filter (corresponding to pixels having a pattern 904), and one blue filter (corresponding to pixels having a pattern 910). The portion 902 illustrates that each super-pixel is composed of 4×4 pixels.

A configuration 912 of the portion 902 illustrates a pixel structure that enables having two exposures within a group of four pixels. Different pixels of a super-pixel can have a different exposure durations. For example, the pixels marked "S" can have a shorter exposure duration than those marked "L." Exposure of the pixels marked "L" can start before the pixels marked "S." However, all pixels can be read out at the same time. As such, with one readout operation, the image sensor can provide two images with different exposure levels. Stated another way, each of the photodiodes of a super-pixel can be exposed differently (e.g., can have different reset times) and a readout mechanism can read them simultaneously. Binning (e.g., diagonal binning in this case) may be used to reconstruct the longer and shorter exposure images.

Figure 10:
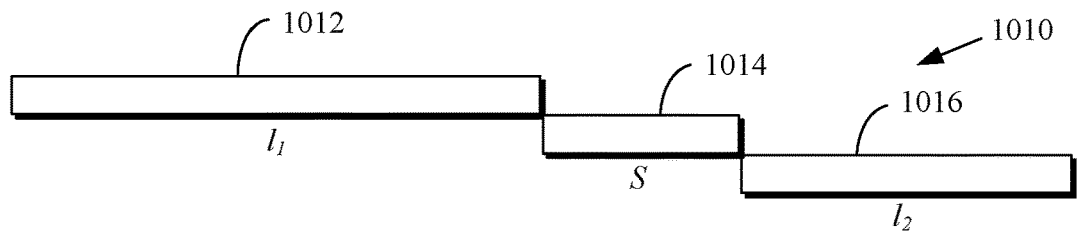
FIG. 10 illustrates modes of operations of the image sensor described with respect to FIG. 9 for obtaining multiple images for HDR processing.
Figure 10:
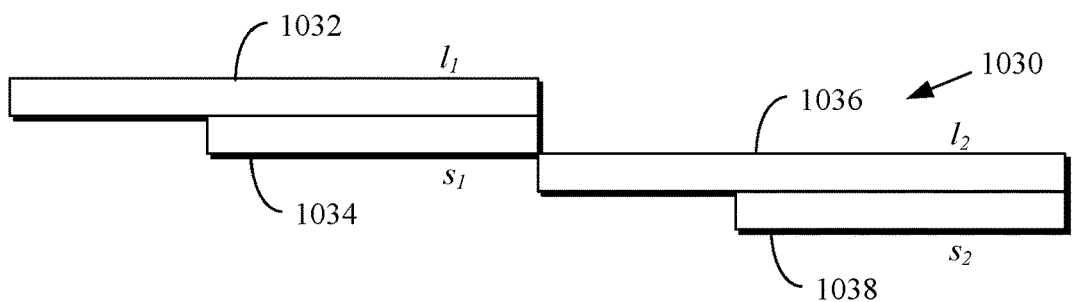

FIG. 10 illustrates modes of operations of the image sensor described with respect to FIG. 9 for obtaining multiple images for HDR processing.

In a first mode 1010, the image sensor can be configured to obtain three images (i.e., a first image 1012, a second image 1014, and a third image 1016) with different exposure durations. The exposure durations are denoted $l_1$, S, and $l_2$ and are configurable. In the first mode 1010, the first image 1012, the second image 1014, and the third image 1016 are exposed sequentially (such as in an interleaving way, as described above, such as with respect to FIG. 8). That is, rows of the first image 1012, of the second image 1014, and of the third image 1016 are exposed sequentially and readout in an interleaving way.

To elaborate further, each row of the sensor can be exposed three times, sequentially: once for the first image 1012 (going through the reset/expose/read out cycle), followed by exposing the sensor again for the second image 1014 (also going through the reset/expose/read out cycle), and then followed by exposing the sensor for the third image 1016. As the sensor may be associated with a single readout mechanism, the readout phase can read the rows of the three images in an interleaved way, at the end of the exposure time of a row for a given image. To illustrate, rows may be read in this order: row i for the first image 1012, then a different row j for the second image 1014, then a different row k for the third image 1016, then row i. I for the first image 1012, then row j. I for the second image 1014, then row k. I for the third image 1016, until all of the three images have been exposed and read out. If the exposure of an image has not started yet, or if the image has been fully read out, the readout mechanism may wait until one of the rows of one of the images becomes available for read-out after the correct exposure duration. The time between the readout of two consecutive lines i and i. I of a given image is called the rolling shutter line skew. The skew can be constant and equal for images.

The long exposure module 708 obtains the long-exposure image 710 as the sum of the first image 1012, the second image 1014 and the third image 1016. As such, the long-exposure image 710 can have an exposure of $L'=l_1+S+l_2$. As mentioned above, obtaining the long-exposure image 710 includes adding the pixels of the first image 1012, the pixels of the second image 1014, and the pixels of the third image 1016. In an example, the exposure durations are configured such that the second image 1014 is temporarily in the middle of the long-exposure image 710. As such, the exposure durations can be configured such that $l_1=l_2$.

As also mentioned above, an auto-exposure algorithm may determine a reference long exposure duration and a reference short exposure duration ($L_R$, $S_R$). In an example, the duration of the second image 1014 can be set to the reference short exposure duration (i.e., $S=S_R$). In an example, ($L_R$, $S_R$) and (L', S) can have the same exposure durations and ratios. That is, the durations of the long-exposure image 710 and the short-exposure image 706 can have roughly the same exposure durations and ratios as those of the reference long exposure duration and the reference short exposure duration. Said yet another way, $$L_R \cong L'; \text{ and } \frac{L_R}{S_R} \cong \frac{L'}{S}.$$

In a second mode 1030, the multiple images 702 of FIG. 7 include four images: a first image 1032, a second image 1034, a third image 1036, and a fourth image 1038 having respective exposure durations $l_1$, $s_1$, $l_2$, and $s_2$. The pair of the first image 1032 and the second image 1034 can be obtained such as described with respect the configuration 912 of FIG. 9; and the pair of the third image 1036 and the fourth image 1028 can also be obtained using the configuration 912. As such, the first image 1032 and the second image 1034 overlap temporally and are readout simultaneously; and the third image 1036 and the fourth image 1038 also overlap temporally and are readout simultaneously. The first pair of images (i.e., the first image 1032 and the second image 1034) and the second pair of images (i.e., the third image 1036 and the fourth image 1038) can be read in an interleaving way.

The short-exposure image 706 of FIG. 7 can be obtained by adding the pixels of the second image 1034 with the pixels of the third image 1036 and subtracting the pixels of the fourth image 1038. As such, the short exposure module 704 has an exposure duration of $S'=s_1+l_2-s_2$. By subtracting the pixels of the fourth image, the short-exposure image 706 can be ensured to be temporally in the middle between the first image 1032 and the third image 1036. The long exposure module 708 can be obtained by adding the pixels of first image 1032 and the pixels of the third image 1036. As such, the long exposure module 708 can have an exposure duration of $L'=l_1+l_2$. The exposure times $l_1$, $s_1$, $l_2$, and $s_2$ can be configured so that the ($L_R$, $S_R$) and (L', S') can have roughly the same exposure durations and ratios. That is, the durations of the long-exposure image 710 and the short-exposure image 706 can have the same exposure durations and ratios as those of the reference long exposure duration and the reference short exposure duration.

In another example, the fourth image 1038 can be ignored (i.e., unused in obtaining the short-exposure image 706 and the long-exposure image 710). In yet another example, the exposure duration of the fourth image 1038 can be set to zero (i.e., $s_2=0$). In either example, the exposure times are such that the short-exposure image 706 is temporally overlapping with the long-exposure image 708. In another example, the exposure duration of the fourth image 1038 can be set as $s_2=l_1-s_1$, which can result in the short-exposure image 706 being in the middle of the long-exposure image 708.

Figure 11:
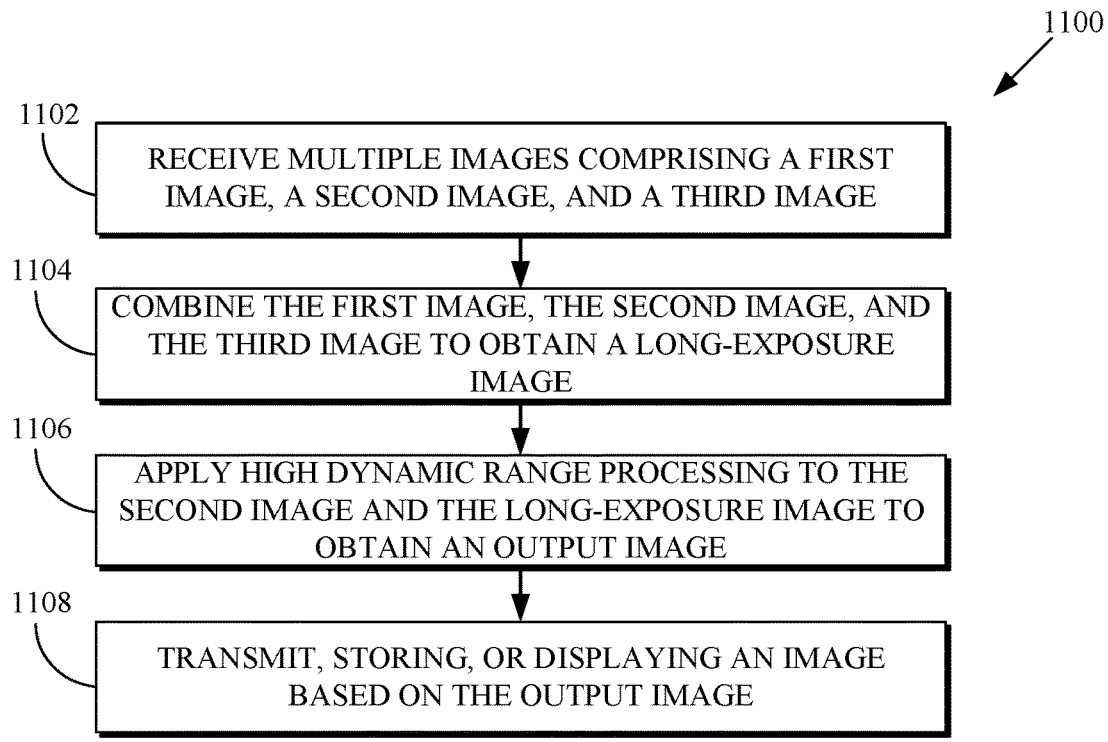
FIG. 11 is flowchart of an example of a technique for obtaining a high dynamic range image.

FIG. 11 is flowchart of an example of a technique 1100 for obtaining a high dynamic range image. The technique 1100 may be implemented or executed at least in part by a system, such as the system 700 of FIG. 7. The technique 1100 may be implemented or executed using an image capture apparatus, such as one of the image capture apparatuses described herein.

At 1102, multiple images are received. The multiple images can be the multiple images 702 of FIG. 7. The multiple images include at least a first image, a second image, and a third image. The images may be captured using an image sensor that may be part of the image capture apparatus. Each of the images may be received from the image sensor via a bus, a communications link, or received in some other way. For example, each of the images may be received via a wireless or wired communications interface (e.g., Wi-Fi, Bluetooth, USB, HDMI, Wireless USB, Near Field Communication (NFC), Ethernet, a radio frequency transceiver, and/or other interfaces). For example, each of the images may be received via a front ISP that performs some initial processing on the received images. Each pixel value in the received images may be represented in a defined format, such as in a RAW image signal format, a YUV image signal format, or a compressed format (e.g., an MPEG or JPEG compressed bitstream). In an example, each of the images may be stored in a format using the Bayer color mosaic pattern. In some implementations, each of the images may be a combined image composed of multiple images from multiple respective image sensors that have been stitched together to form the combined image with a shared field of view.

The image sensor may be a digital overlap high dynamic range (DOL-HDR) sensor. In an example, the first image, the second image, and the third image may be received in an interleaved pattern of image portions, such that exposure of an image portion of the first image commences when pixels of a same image portion of the second image are read and reset. For example, an exposure period of the first image may be adjacent in time to an exposure period of the second image; and an exposure period of the second image may be adjacent in time to an exposure period of the third image. For example, the image portion may be a row of pixels, set of rows of pixels, or a block of pixels.

In an example, the image sensor can be configured to set respective exposure durations for the first image, the second image, and the third image. In an example, the first image and the third image can have a same exposure duration. In an example, the exposure duration of the first and the third images can be greater than the exposure of the second image.

At 1104, the first image, the second image, and the third image are combined to obtain a long-exposure image. For example, the first image, the second image, and the third image can be added to obtain the long-exposure image. In an example, the images may be added without scaling or after scaling to reverse gains applied by an upstream portion of an image processing pipeline (e.g., a gain applied by a front image signal processor), such that the images are represented in common units. Combining the first image, the second image, and the third image may approximate capturing a long-exposure image over an exposure period including the respective exposure durations of the first, second, and third images. In some implementations, combining the first, second, and third images includes subtracting respective black levels of one or more images so as to retain a black level pedestal of one of the images in the output image.

At 1106, HDR processing is applied to the second image and the long-exposure image to obtain an output image. The HDR processing uses the second image as a short-exposure image. The HDR processing results in the output image having a larger dynamic range than at least the short-exposure image. For example, pixels of the long-exposure image that are saturated may be replaced by corresponding pixels of the short-exposure image in the output image, and pixels of the output image may be determined based on corresponding pixels of the long-exposure image where those pixels of the long-exposure image are not saturated. Other ways of combining or fusing the pixels of the long-exposure image and the short-exposure image are possible.

At 1108, an image is transmitted, stored, or displayed based on the output image. For example, the image may be transmitted to an external device (e.g., a personal computing device) for display or storage. For example, the image may be the same as the output image. For example, the image may be a composite image determined by stitching an image based on the output image to one or more images from other image sensors with overlapping fields of view. For example, the image may be compressed using an encoder (such as the encoder 630 of FIG. 6). For example, the image may be transmitted via a communications interface. For example, the image may be displayed in a user interface. For example, the output image may be stored in a memory of the image processing apparatus.

In an example, an image stabilization operation can be applied to the output image based on a global motion model corresponding to the second image. In an example, the image stabilization operation may be applied to the second image and to the long-exposure image based on the global motion model corresponding to the second image. As the short-exposure image is in the middle of the long-exposure image, the stabilization operation can effectively result in at least significantly reduced blur in the output image therewith resulting in a sharp output image.

Figure 12:
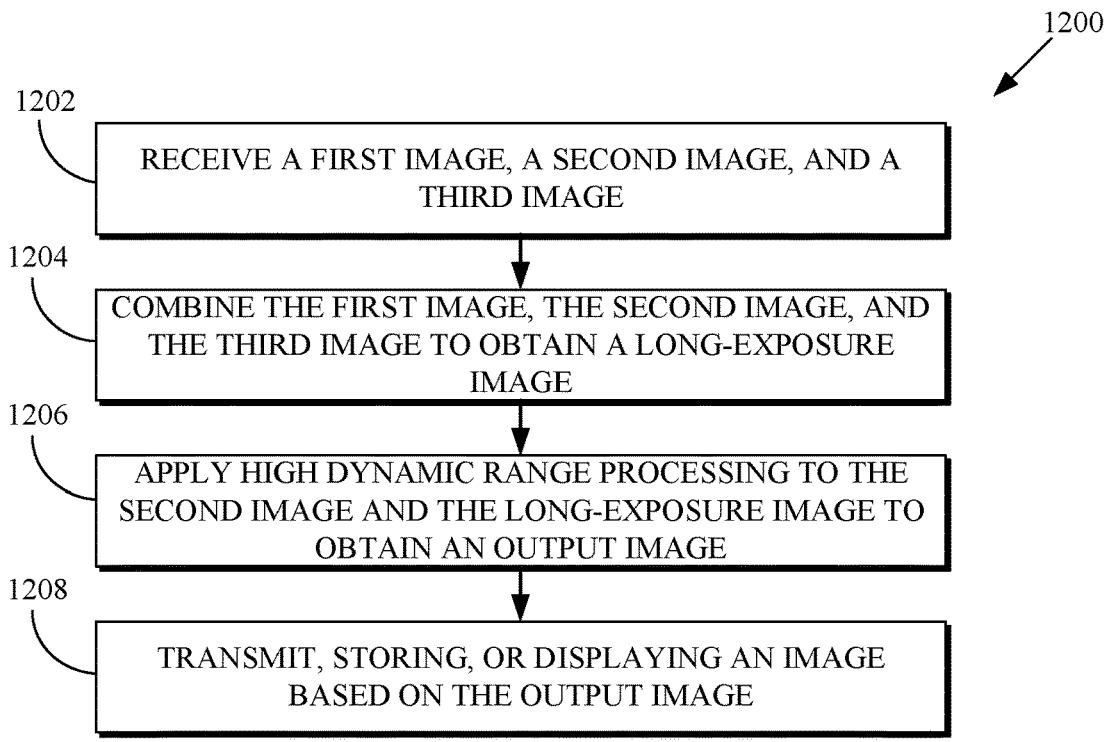
FIG. 12 is flowchart of another example of a technique for obtaining a high dynamic range image.

FIG. 12 is flowchart of another example of a technique 1200 for obtaining a high dynamic range image. The technique 1200 may be implemented or executed at least in part by a system, such as the system 700 of FIG. 7. The technique 1200 may be implemented or executed using an image capture apparatus, such as one of the image capture apparatuses described herein.

At 1202, a first image, a second image, and a third image are received. The first image, the second image, and the third image can be, respectively, the first image 1012, the second image 1014, and the third image 1016 of the first mode 1010 of FIG. 10. As such, the second image can be temporally between the first image and the third image. In an example, the second image is temporally in the middle of the first image and the third image. The first image, the second image, and the third image can be received as described above. As such, the images may be captured using an image sensor that may be part of the image capture apparatus. The first image, the second image, and the third image can be received in an interleaved pattern of image portions, as described above. In an example, the first image and the third image can have the same exposure duration.

At 1204, the first image, the second image, and the third image are combined to obtain a long-exposure image. As such, the second image can be temporally in the middle of the long-exposure image. Combining images (e.g., the first image, the second image, and the third image) can be as described above. At 1206, high dynamic range processing can be applied to the second image and the long-exposure image to obtain an output image with a larger dynamic range than that of at least the second image. The high dynamic range processing uses the second image as a short-exposure image. At 1208, an image is transmitted, stored, or displayed based on the output image, such as described above with respect to FIG. 11.

In an example, and as described above, a reference short-exposure duration $S_R$ and a reference long-exposure duration $L_R$ can be obtained, such as from an auto-exposure algorithm. The image sensor can be configured to set respective the exposure durations $l_1$, S, and $l_2$ for the first image, the second image, and the third image such that $L_R$ is approximately equal to $l_1+S+l_2$. In an example, an image stabilization operation can be applied to the output image based on a global motion model corresponding to the second image. In an example, the image stabilization operation can be applied to the second image and to the long-exposure image based on the global motion model corresponding to the second image.

Figure 13:
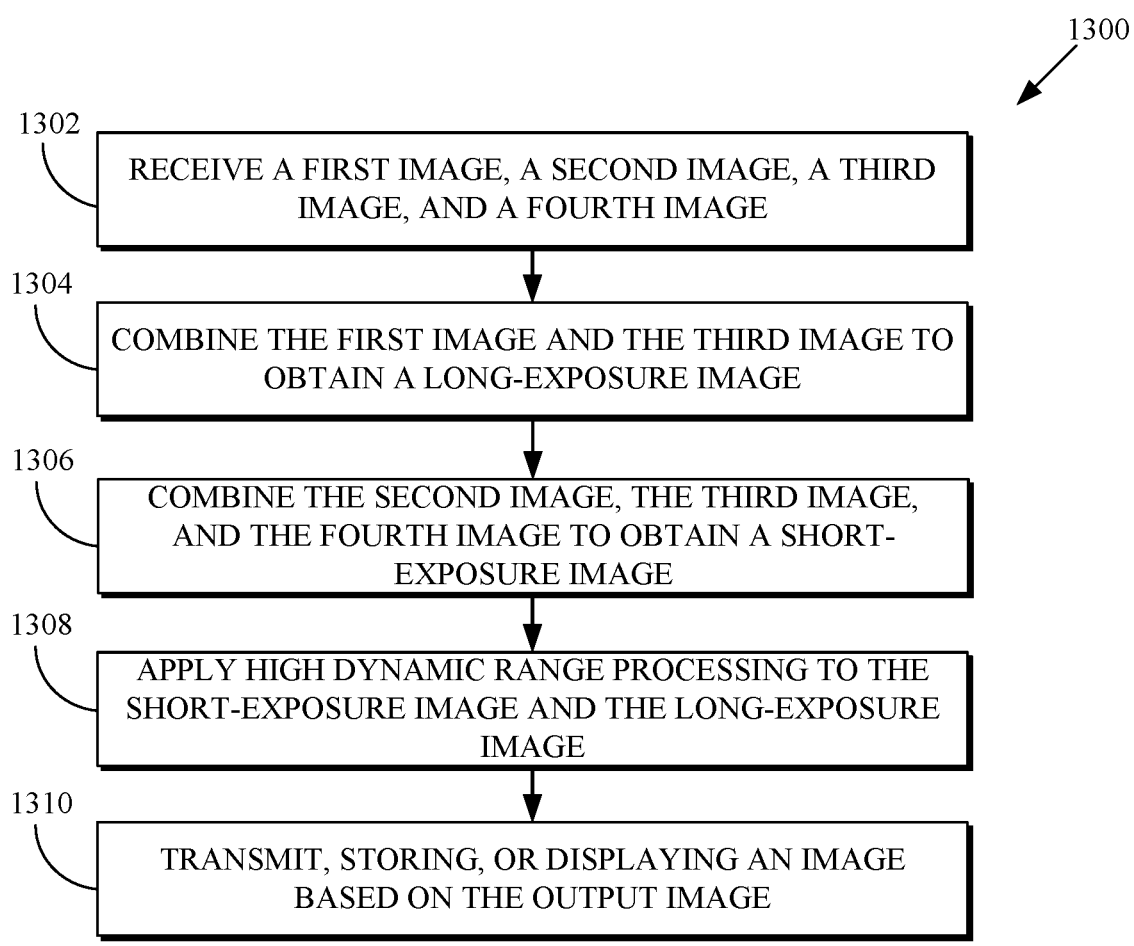
FIG. 13 is flowchart of another example of a technique for obtaining a high dynamic range image.

FIG. 13 is flowchart of another example of a technique 1300 for obtaining a high dynamic range image. The technique 1300 may be implemented or executed at least in part by a system, such as the system 700 of FIG. 7. The technique 1300 may be implemented or executed using an image capture apparatus, such as one of the image capture apparatuses described herein.

At 1302, a first image, a second image, a third image, and a fourth image are received. The first image, the second image, the third image, and the fourth image can be, respectively, the first image 1032, the second image 1034, the third image 1036, and the fourth image 1038 of the second mode 1030 of FIG. 10. As such, an image sensor used for capturing at least the first image and the second image can be a multi-exposure image sensor that starts exposing the first image and the second image at different respective starting times and ends the exposing at a same exposure ending time. As such, receiving the first image, the second image, the third image, and the fourth image can include simultaneously receiving the first image and the second image based on one readout operation of the image sensor. In an example, the first image and the second image can be received based on a first readout operation of the image sensor and the third image and the fourth image can be received based on a second readout operation of the image sensor.

In an example, the first image and the third image have a first same exposure duration; and the second image and the fourth image have a second same exposure duration. That is, in an example, the image sensor can be configured such that the first image and the third image have the first same exposure duration; and the second image and the fourth image have the second same exposure duration.

In an example, the image sensor can be configured such that the fourth image has an exposure duration that is equal to the difference between the exposures of the first image and the second image so that the short-exposure image is temporally in the middle of the long-exposure image. While no specific condition need be satisfied with respect to the exposure duration of the first and third images, that the exposure duration of the fourth image is equal to the difference between the exposure durations of the first image and the second image can result in the short-exposure image being temporally in the middle of the long-exposure image.

At 1304, the first image and the third image are combined to obtain a long-exposure image. At 1306, the second image, the third image, and the fourth image are combined to obtain a short-exposure image. Combining second image, the third image, and the fourth image can include subtracting pixel values of the fourth image from a sum of respective pixels values of the second image and the third image.

At 1308, high dynamic range processing is applied to the short-exposure image and the long-exposure image to obtain an output image with a larger dynamic range than the dynamic ranges of any of the first image, the second image, the third image, and the fourth image. Applying the high dynamic range processing can be as described above. At 1310, an image is transmitted, stored, or displayed based on the output image, such as described above with respect to FIG. 11.

In an example, an image stabilization operation can be applied to the output image based on a global motion model corresponding to the short-exposure image. In an example, the image stabilization operation can be applied to the short-exposure image and to the long-exposure image based on a global motion model corresponding to the short-exposure image. The image stabilization operation can be applied before applying the high dynamic range processing. As the short-exposure image is in the middle of the long-exposure image, the stabilization operation can effectively result in at least significantly reduced blur in the output image therewith resulting in a sharp output image.

The methods and techniques of combining images for HDR processing described herein, or aspects thereof, may be implemented by an image capture apparatus, or one or more components thereof, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, the image capture apparatus 500 shown in FIG. 5, the pipeline 600 of FIG. 6, or the system 700 of FIG. 7. The methods and techniques of combining images for HDR processing described herein, or aspects thereof, may be implemented by an image capture device, such as the image capture device 104 shown in FIGS. 1A-1B, one or more of the image capture devices 204, 206 shown in FIGS. 2A-2B, one or more of the image capture devices 304, 306 shown in FIG. 3, the image capture device 404 shown in FIGS. 4A-4B, or an image capture device of the image capture apparatus 500 shown in FIG. 5. The methods and techniques of combining images for HDR processing described herein, or aspects thereof, may be implemented by an image processing pipeline, or one or more components thereof, such as the image processing pipeline 600 shown in FIG. 6. The methods and techniques of combining images for HDR processing described herein, or aspects thereof, may be implemented by a system, or one or more components thereof, such as the system 700 shown in FIG. 7.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
obtaining a reference short-exposure duration ($S_R$) and a reference long-exposure duration ($L_R$);
configuring an image sensor to set respective exposure durations 11, S, and 12 for a first image, a second image, and a third image such that $L_R$ is approximately equal to 11+S+12;
receiving multiple images comprising the first image, the second image, and the third image, wherein the second image is temporally between the first image and the third image;
combining the first image, the second image, and the third image to obtain a long-exposure image;
applying high dynamic range processing to the second image and the long-exposure image to obtain an output image with a larger dynamic range than a dynamic range of the second image, wherein the high dynamic range processing uses the second image as a short-exposure image; and
transmitting, storing, or displaying an image based on the output image.

2. The method of claim 1, wherein the first image and the third image have a same exposure duration.

3. The method of claim 1, wherein receiving the multiple images comprises:
receiving the first image, the second image, and the third image in an interleaved pattern of image portions, such that exposure of an image portion of the second image commences when pixels of a same image portion of the first image are read and reset.

4. The method of claim 1, further comprising:
applying an image stabilization operation to the output image based on a global motion model obtained based on the second image.

5. The method of claim 1, further comprising:
applying an image stabilization operation to the second image and to the long-exposure image based on a global motion model obtained based on the second image.

6. An apparatus, comprising:
a processor configured to:

obtain a reference short-exposure duration ($S_R$) and a reference long-exposure duration ($L_R$);

configure an image sensor to set respective exposure durations 11, S, and 12 for a first image, a second image, and a third image such that $L_R$ is approximately equal to 11+S+12;

receive the first image, the second image, and the third image, wherein the second image is temporally between the first image and the third image;

combine the first image, the second image, and the third image to obtain a long-exposure image;

apply high dynamic range processing to the second image and the long-exposure image to obtain an output image with a larger dynamic range than a dynamic range of the second image, wherein the high dynamic range processing uses the second image as a short-exposure image; and transmit, store, or display an image based on the output image.

7. The apparatus of claim 6, wherein the processor is further configured to:

receive the first image, the second image, and the third image in an interleaved pattern of image portions.

8. The apparatus of claim 6, wherein the processor is further configured to:

apply an image stabilization operation to the output image based on a global motion model corresponding to the second image.

9. The apparatus of claim 6, wherein the processor is further configured to:

apply an image stabilization operation to the second image and to the long-exposure image based on a global motion model corresponding to the second image.

10. The apparatus of claim 6, wherein the second image is temporally in a middle of the long-exposure image.

11. The apparatus of claim 6, wherein the first image and the third image have a same exposure duration.

12. A non-transitory computer-readable storage medium comprising instructions executable by a processor to:

receive a first image, a second image, a third image, and a fourth image;

combine the first image and the third image to obtain a long-exposure image;

combine the second image, the third image, and the fourth image to obtain a short-exposure image;

apply high dynamic range processing to the short-exposure image and the long-exposure image to obtain an output image with a larger dynamic range than any of the first image, the second image, the third image, and the fourth image; and transmit, store, or display an image based on the output image.

13. The non-transitory computer-readable storage medium of claim 12, wherein an image sensor used for capturing at least the first image and the second image is a multi-exposure image sensor that starts exposing the first image and the second image at different respective starting times and ends the exposing at a same exposure ending time, and wherein to receive the first image, the second image, the third image, and the fourth image comprises to:

simultaneously receive the first image and the second image based on one readout operation of the image sensor.

14. The non-transitory computer-readable storage medium of claim 12, wherein the fourth image has an exposure duration that is equal to a difference between an exposure duration of first image and an exposure duration of the second image.

15. The non-transitory computer-readable storage medium of claim 12, wherein the first image and the second image are received based on a first readout operation of an image sensor and the third image and the fourth image are received based on a second readout operation of the image sensor.

16. The non-transitory computer-readable storage medium of claim 15, wherein the instructions further comprise instructions executable by the processor to:

apply an image stabilization operation to the output image based on a global motion model corresponding to the short-exposure image.

17. The non-transitory computer-readable storage medium of claim 12, wherein the instructions further comprise instructions executable by the processor to:

apply an image stabilization operation to the short-exposure image and to the long-exposure image based on a global motion model corresponding to the short-exposure image.

18. The non-transitory computer-readable storage medium of claim 12, wherein to combine the second image, the third image, and the fourth image to obtain the short-exposure image comprises:

subtracting pixel values of the fourth image from a sum of respective pixels values of the second image and the third image.

19. The method of claim 1, wherein the second image is temporally in a middle of the long-exposure image.

20. The apparatus of claim 7, wherein exposure of an image portion of the second image commences when pixels of a same image portion of the first image are read and reset.

* * * * *